US011428918B2

(12) United States Patent
Peschka et al.

(10) Patent No.: US 11,428,918 B2
(45) Date of Patent: Aug. 30, 2022

(54) LIGHT SOURCE FOR A SURGICAL MICROSCOPE

(71) Applicant: Carl Zeiss Meditec AG, Jena (DE)

(72) Inventors: Martin Peschka, Aalen (DE); Peter Reimer, Ellwangen (DE)

(73) Assignee: Carl Zeiss Meditec AG, Jena (DE)

(*) Notice: Subject to any disclaimer, the term of this patent is extended or adjusted under 35 U.S.C. 154(b) by 99 days.

(21) Appl. No.: 16/584,837

(22) Filed: Sep. 26, 2019

(65) Prior Publication Data
US 2020/0096755 A1    Mar. 26, 2020

(30) Foreign Application Priority Data

Sep. 26, 2018   (DE) .................. 10 2018 216 392.8

(51) Int. Cl.
| | |
|---|---|
| *G02B 21/00* | (2006.01) |
| *G02B 21/06* | (2006.01) |
| *G02B 21/08* | (2006.01) |
| *F21V 8/00* | (2006.01) |

(52) U.S. Cl.
CPC ............ *G02B 21/08* (2013.01); *G02B 6/0005* (2013.01); *G02B 21/0012* (2013.01)

(58) Field of Classification Search
CPC .......... G02B 21/00; G02B 21/0012; G02B 21/0032; G02B 21/006; G02B 21/06; G02B 21/08; G02B 5/00; G02B 5/02; G02B 5/0205
USPC .................................................. 359/368–390
See application file for complete search history.

(56) References Cited

U.S. PATENT DOCUMENTS

| | | | | |
|---|---|---|---|---|
| 9,482,877 B2 * | 11/2016 | Janssens | ............ | G02B 27/0927 |
| 9,594,240 B2 * | 3/2017 | Kimura | ............... | G02B 27/0994 |
| 9,863,759 B2 * | 1/2018 | Takahashi | ............... | G01B 11/14 |

(Continued)

FOREIGN PATENT DOCUMENTS

| | | |
|---|---|---|
| DE | 202004019849 U1 | 3/2005 |
| DE | 102005014640 A1 | 10/2006 |
| DE | 102016100804 A1 | 7/2017 |

OTHER PUBLICATIONS

Office Action issued in German Patent Application No. DE 10 2018 216 392.8 (from which this application claims priority), dated May 21, 2019.

*Primary Examiner* — Thong Q Nguyen
(74) *Attorney, Agent, or Firm* — Falk Ewers; Ewers IP Law PLLC

(57) ABSTRACT

A light source for a surgical microscope includes a laser light source, first and second scattering elements defining first and second planes, respectively, and a collector optical device arranged between the first and second scattering elements with a focal length and a focus in the first plane. The laser light is focused on a first beam cross section with a first dimension in the first plane. The scattered beam emanating from the first scattering element is imaged at infinity with a first numerical aperture and produces a second beam cross section with a second dimension in the second plane. The second scattering element emits a beam of illumination light with a second numerical aperture at each point of the beam cross section in the second plane. The illumination light emanating from the second scattering element forms an illuminated field imageable into an object plane by an illumination optical device.

20 Claims, 13 Drawing Sheets

(56) References Cited

U.S. PATENT DOCUMENTS

2008/0079904 A1 4/2008 Bartlett
2017/0209032 A1 7/2017 Matsunobu et al.

\* cited by examiner

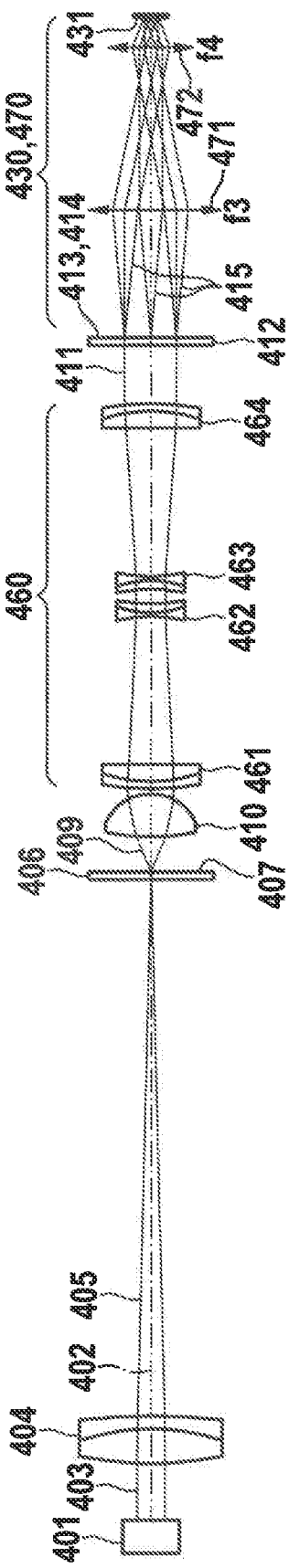
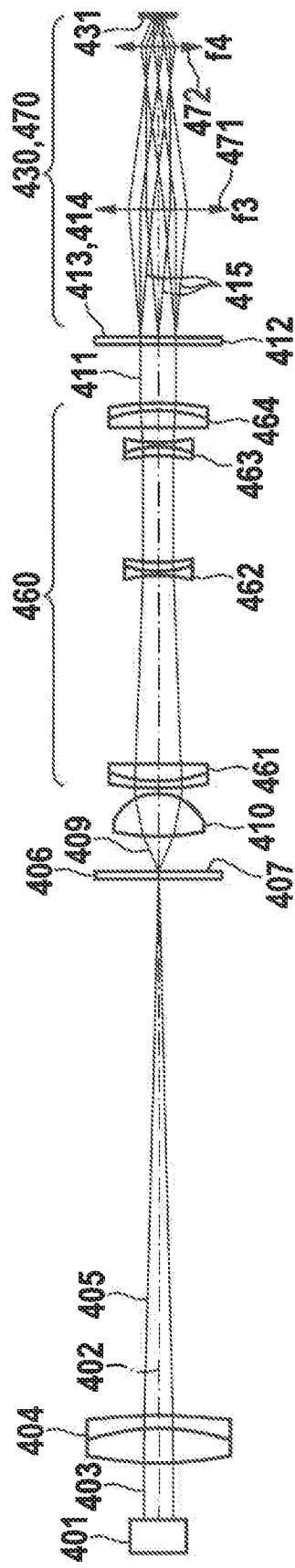
FIG. 4A
FIG. 4B

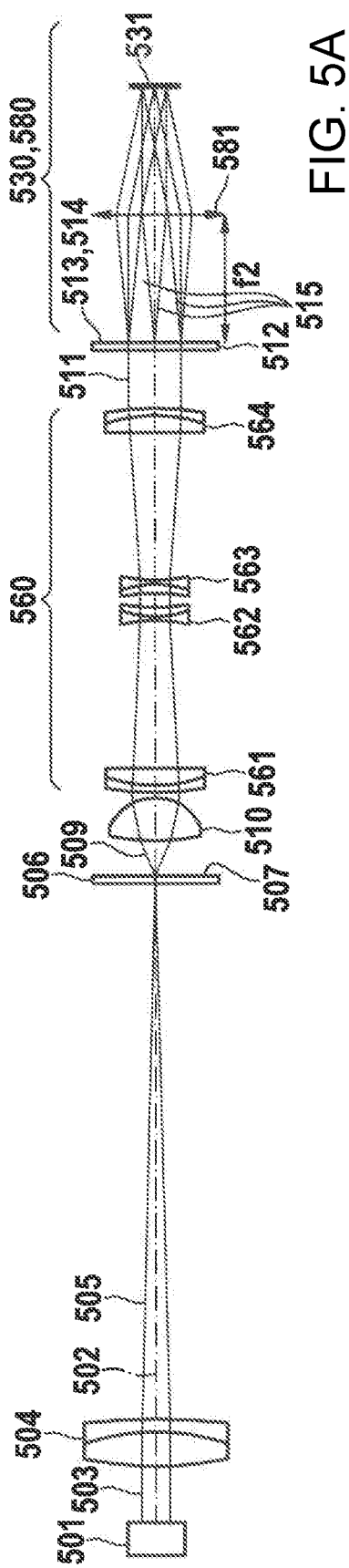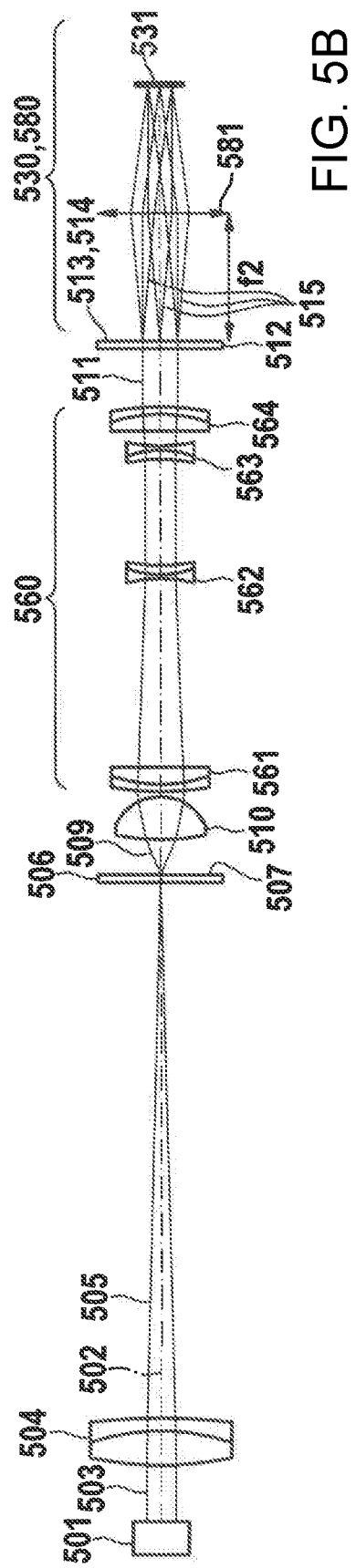

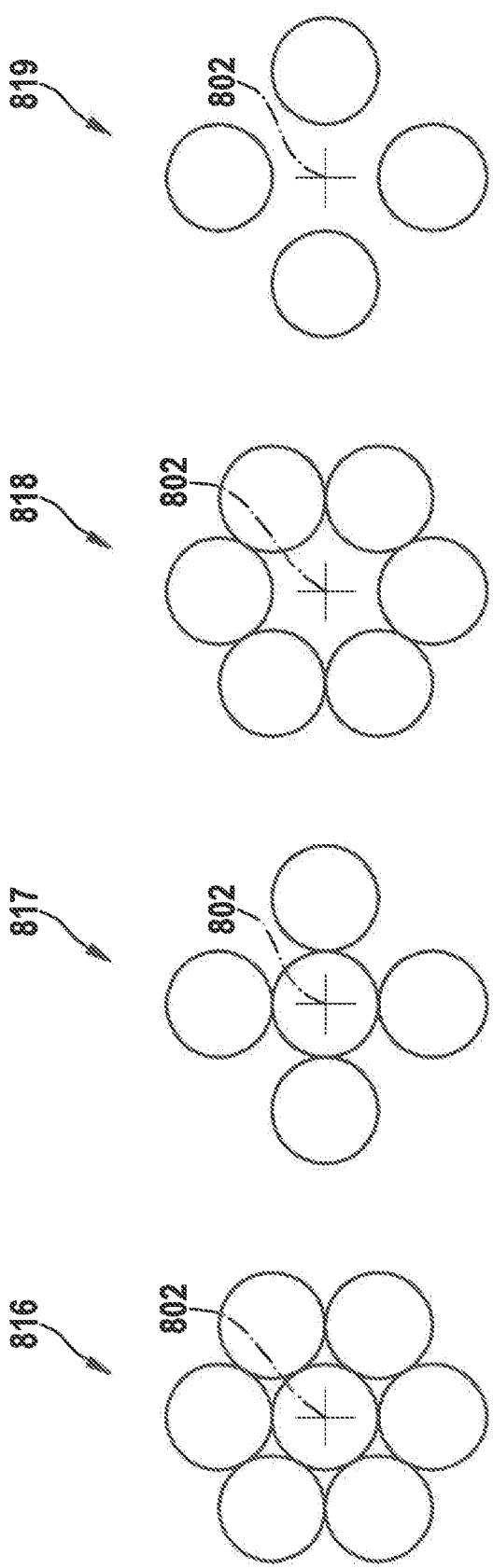

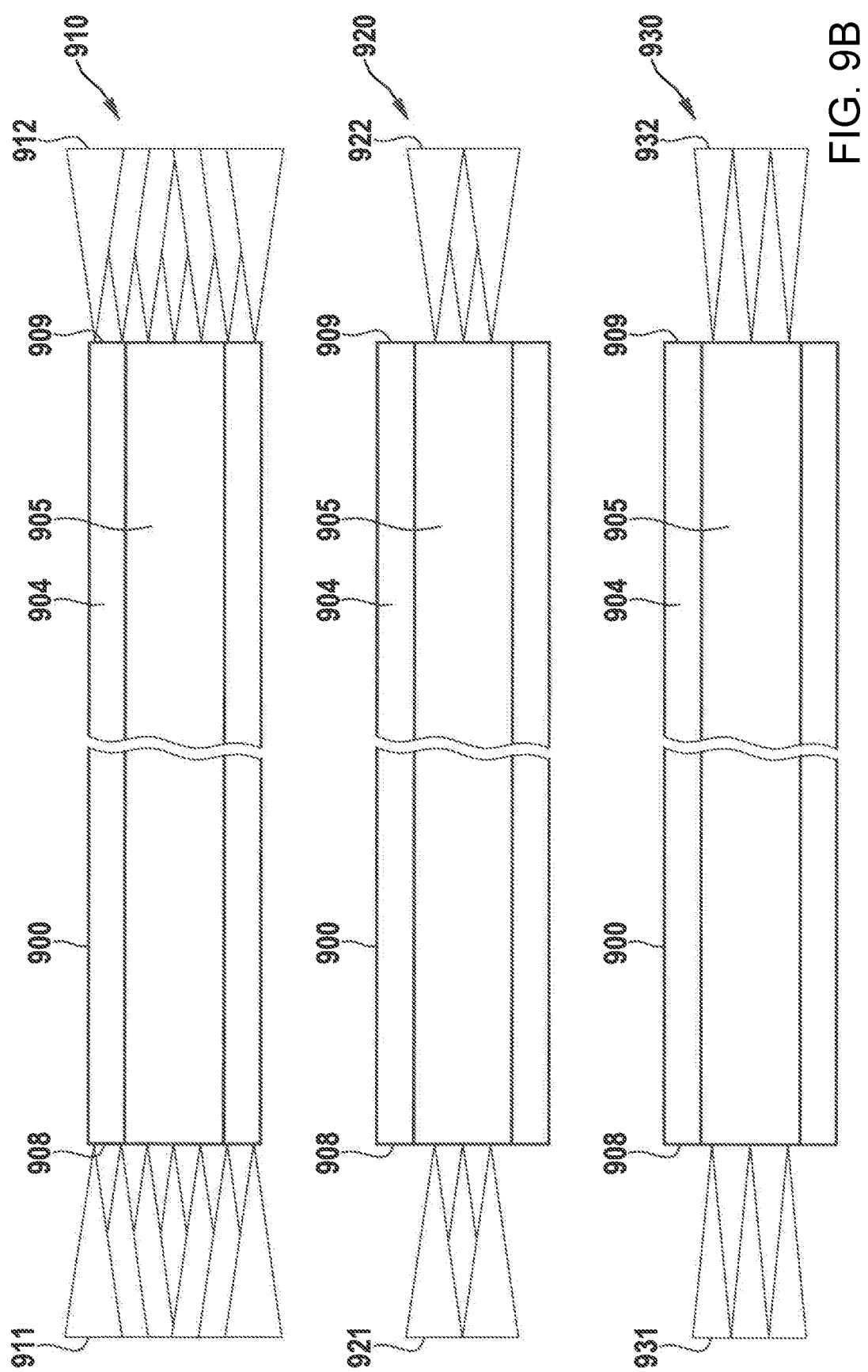

LIGHT SOURCE FOR A SURGICAL MICROSCOPE

CROSS REFERENCE TO RELATED APPLICATIONS

This application claims priority to German patent application DE 10 2018 216 392.8, filed Sep. 26, 2018, the entire content of which is incorporated herein by reference.

TECHNICAL FIELD

The disclosure relates to a light source for a surgical microscope.

BACKGROUND

Photosensitizers that can selectively accumulate in or on a diseased cell can be administered to a patient for the purposes of examining and treating tumors or a precancerous condition. If the sensitizers, which are also referred to as markers, are made to fluoresce by way of irradiation by light having a component of a certain wavelength, such a fluorescence light can be detected by the naked eye or by an optical system and hence the tumor can be localized. The sensitizers do not accumulate in healthy tissue, and so the diseased tissue can be identified by way of a significantly higher fluorescence. By way of example, such a fluorescence diagnosis is established practice in dermatology, gynecology, and ophthalmology. In some types of tissue, it is possible to excite autofluorescence without the addition of sensitizers if the tissue is irradiated by light of a certain wavelength. By way of example, applications to this end are found in ophthalmology and dentistry.

Illumination apparatuses for surgical microscopes include white light sources for illuminating the object region to be examined, for example halogen, xenon or light emitting diode (LED) light sources. Therefore, when observing weakly fluorescent markers in the tissue or when observing autofluorescence, it is necessary to illuminate the tissue with high irradiance by light of a certain excitation wavelength.

The use of the spectral components of the light source for exciting the fluorescence is known, for example in the case of gas discharge lamps or LED light sources. Specific filters can also be used. However, the illumination of the fluorescence excitation can be very weak in relation to the white light power, or cannot be adjustable in the relative brightness. A further disadvantage lies in the fact that the excitation spectrum may include a wavelength range that is too broad, resulting in additional tissue exposure by an unnecessary influx of energy. It may also be disadvantageous that the extent of the illuminated field in the object plane for illuminating the fluorescence excitation cannot be variably set in relation to the white light illumination.

SUMMARY

It is therefore an object of the disclosure to provide a surgical microscope illumination apparatus with an improved illumination for fluorescence excitation.

The object is achieved by a light source for a surgical microscope as described herein.

According to an aspect of the disclosure, a light source or light source device for a surgical microscope includes a laser light source, a first scattering element SE1 which defines a first plane, a second scattering element SE2 which defines a second plane, and a collector optical device OS1, arranged between the first scattering element SE1 and the second scattering element SE2, with a first focal length f and a first focus P1. The first focus P1 of the collector optical device OS1 lies in the first plane on the first scattering element SE1.

The laser light emitted by the laser light source is focused on a first beam cross section with a first dimension L1 in the first plane on the first scattering element SE1. The scattered beam emanating from the first scattering element SE1 is imaged at infinity with the first numerical aperture NA(SE1) by the collector optical device OS1 and produces a second beam cross section with a second dimension L2 in the second plane on the second scattering element SE2.

The second scattering element SE2 in each case emits a beam of illumination light with a second numerical aperture NA(SE2) at each point of the beam cross section in the second plane, wherein the illumination light emanating from the second scattering element SE2 forms a first illuminated field. The first illuminated field is imageable into an object plane by an illumination optical device.

A light source includes a laser light source, a first scattering element SE1, a second scattering element SE2 and a collector optical device OS1, arranged between the first scattering element SE1 and the second scattering element SE2, with a first focal length f and a first focus P1. The first scattering element SE1, the collector optical device OS1 and the second scattering element are arranged along an optical axis.

The coherent illumination light emitted by a laser light source is focused with a first beam cross section L1 in a first plane on a first scattering element SE1. The collector optical device OS1 is arranged downstream of the first scattering element SE1. The collector optical device OS1 has a first focal length f. In the first plane on the first scattering element SE1, the focus P1 of the collector optical device OS1 lies in the focused first beam cross section with the dimension L1 of the laser light.

A beam cross section may have any form. A beam cross section forms an area in a plane perpendicular to the optical axis of the illumination beam path. The greatest extent of this beam cross-sectional area is relevant to the calculation of an etendue. In the normal case, a beam cross section has a substantially oval or round form. Therefore, a beam cross section is defined by one dimension in this application. The dimension L1 is characterized by the greatest linear length or extent of the beam cross-sectional area. If the beam cross section forms an oval, the dimension L1 is defined by the semimajor axis. If the beam cross section is round, the dimension L1 is defined by the diameter. If the beam cross section has a rectangular form or a square form, the dimension L1 is defined by the length of the diagonal. If the beam cross section forms a polygon, the dimension L1 is defined by the length of the longest diagonal.

The etendue is defined as a product of numerical aperture and dimension of the beam cross section. This applies to each point in the optical beam path. In the geometric optics, the etendue is a conserved quantity for systems with refractive and reflective surfaces. The etendue can be increased by scattering. In the case of vignetting or clipping, for example by a stop, the etendue can be reduced under the loss of light.

The first scattering element SE1 has a scattering effect on the laser light focused in the first plane. The definition of a scattering effect is that a plurality of individual light rays are emitted into a solid angle range from a light point or light center on a scattering element. Here, the individual rays are emitted both perpendicular to the first plane and also at an angle in relation thereto. The sum of these individual light rays is referred to as a scattered beam. The solid angle range is also referred to as scattering angle range.

According to an aspect of the disclosure, a scattering element is defined as an areal optical element with a light-scattering effect. A scattering element is a light converter. By way of example, a scattering element can be formed by a diffusion screen, a diffractive optical element (DOE) or controllable liquid crystal cells. The profile of the scattering effect can be constant over the area or can vary over the area. A scattering element can also be formed by a microlens array, in which the numerical aperture of the microlens elements is determined. A scattering element can also be formed by a honeycomb condenser.

The scattered beam emanating from the first scattering element SE1 has a first numerical aperture NA(SE1). The collector optical device OS1 guides this scattered beam onto the second scattering element SE2. The collector optical device OS1 images the beam emanating from the first scattering element SE1 at infinity in collimated fashion. The beam collimated thus then strikes the second scattering element SE2 in the second plane in the parallel beam path. The illumination light has a very small, diffraction-limited, punctiform first beam cross section with the first dimension L1 in the first plane, on the first scattering element SE1. Advantageously, this small first beam cross section is producible by the focused laser light.

On the second scattering element SE2, in the second plane, the collimated illumination light has a significantly larger second beam cross section with the second dimension L2. The explanations, given above, in relation to the first dimension L1 also apply to the second dimension L2. The size of the second beam cross section with the second dimension L2 depends on the scattering angle range of the first diffusion screen SE1 and the focal length f of the collector optical device OS1.

Each point of the beam cross section in the first plane on the first scattering element SE1 is collimated at infinity by the collector optical device OS1. Light from the point that coincides with the first focus P1 of the collector optical device OS1 is collimated in the direction of the optical axis of the collector optical device OS1. Light from points in the beam cross section in the first plane of the first scattering element SE1, which points are laterally displaced in relation to the focus P1 of the collector optical device OS1, is collimated at an angle with respect to the optical axis of the collector optical device OS1 that depends on the lateral displacement and the focal length f of the collector optical device OS1. Upstream of the second scattering element SE2, the tangent of the half aperture angle of the collimated beam is given by $L1/(2\times f)$. As a result of the small first beam cross section L1, this aperture angle, which may not be undershot, can remain very small.

The parallel beam produces a large number of small light centers in the second plane on the second scattering element SE2, said light centers each emitting a scattered beam into a solid angle range. Consequently, at each point in the second beam cross section with the dimension L2 in the second plane of the second scattering element SE2, the scattering effect of the second scattering element SE2 produces a beam of emitted illumination light with a second numerical aperture NA(SE2) in each case. The second numerical aperture NA(SE2) is defined by the scattering effect of SE2 and by the aperture angle of the collimated beam upstream of SE2.

The illumination light emanating from the second scattering element SE2 forms a first illuminated field. The first illuminated field has the size of the second beam cross section. The illumination light emitted by the first illuminated field is couplable into the illumination beam path of a surgical microscope. By way of example, this input coupling can be implemented directly or by an optical system and/or an optical fiber bundle. The illumination beam path guides the input coupled illumination light to an object plane in an object region such that the object region is illuminated with defined irradiance by the wavelength of the employed laser light source. The first illuminated field is imageable into an object plane by the illumination optical device.

By adapting the scattering effect of the first scattering element SE1, the first numerical aperture NA(SE1) is adjustable and consequently the dimension L2 of the second beam cross section is adjustable in the second plane at the location of the second scattering element SE2.

Together with the focal length f of the collector optical device OS1, the first beam cross section with the first dimension L1 of the focused laser light in the first plane of the first scattering element SE1 sets the minimal achievable value NAmin(SE2) of the numerical aperture NA(SE2) at the location of the second scattering element SE2. The minimum achievable etendue LLWmin(SE2) at the location of the second scattering element SE2 equals $L2\times NAmin(SE2)$.

By adapting or changing the scattering effect of the second scattering element SE2, the second numerical aperture NA(SE2) downstream of the second scattering element SE2 can be increased in targeted fashion, and hence it is possible to change the etendue in the first illuminated field from a minimum of $L2\times NAmin(SE2)$ to the value of $L2\times NA(SE2)$. This can be implemented with small changes in the effectiveness by using scattering elements SE1 and SE2 with a high transmission. Here, the effectiveness is greatest for the case of the smallest etendue.

As a result, it is possible to provide a particularly efficient light source device, adjustable in terms of its light value, with a high degree of efficiency. The effectiveness is defined as the luminous flux in the first illuminated field in relation to the luminous flux of the laser light source.

As a result of the adjustability of the parameters for the etendue in the first illuminated field, the second dimension L2 of the second beam cross section and the second numerical aperture NA(SE2), this etendue, in a manner suitable for the illumination task, can be adapted in a range to the illumination beam path of a surgical microscope. In particular, depending on the illumination beam path, the illuminated field diameter in the object plane of the surgical microscope can be varied with great effectiveness by way of suitably setting the second dimension L2 and the second numerical aperture NA(SE2).

Consequently, the second beam cross section with the dimension L2 and the second numerical aperture of the first illuminated field are advantageously adjustable independently of one another and dependent on the choice of the first scattering element SE1 and the second scattering element SE2, wherein the second numerical aperture NA(SE2) is greater than or equal to NAmin (SE2). In the process, the overall system has a high and virtually unchanged effectiveness, independently of the selection of the first scattering element SE1 and of the second scattering element SE2.

The laser light source emits laser light having a central wavelength that is suitable for the fluorescence observation. The laser light source is advantageous in that a very high luminous power is available in a narrow wavelength range. As a result, an excitation wavelength for the fluorescence observation has a narrow wavelength range, reducing the radiation exposure of tissue by an unnecessary influx of energy.

Advantageously, the laser light emitted by the laser light source has a low etendue and, as a result thereof, it is focusable in diffraction-limited fashion in a very small beam cross section in the first plane. This minimizes the smallest second numerical aperture NAmin(SE2) and hence minimizes the smallest achievable etendue L2×NAmin(SE2) of the first illuminated field. As a result, an efficient and particularly high concentration of the illumination light is effectible in the object plane, already as a result of a light source-side manipulation only. Consequently, the light source is also advantageously usable in installation space-saving illumination beam paths in a surgical microscope that has no displaceable lenses for illumination zoom functions.

The concentration of the illuminated field in the surgical microscope is advantageous in that the high fluorescence-exciting luminous power can be restricted to small regions, avoiding or reducing the exposure of the surrounding tissue by an unnecessary influx of energy.

The first scattering element SE1 is a diffusion screen in an exemplary embodiment of the disclosure. A diffusion screen is economical.

The first scattering element SE1 is a diffractive optical element in an exemplary embodiment of the disclosure.

The scattering behavior can be structured using a diffractive optical element (DOE). The angle distribution can be influenced in targeted fashion. The diffractive optical element can be designed in such a way that a homogeneous distribution is effected. A center-weighted distribution can also be set in one exemplary embodiment.

The first scattering element SE1 carries out a rotating movement in an exemplary embodiment of the disclosure.

Advantageously, speckle patterns can be averaged out over time. Speckles are reduced. A rotation of the first scattering element can be effected in cost-effective fashion.

The first scattering element SE1 oscillates laterally in the first plane in an exemplary embodiment of the disclosure.

Advantageously, speckle patterns are averaged out over time and reduced. Moreover, use can be made of a first scattering element SE1, the scattering effect of which is not constant over the area thereof. Advantageously, a plurality of first scattering elements can be used on a laterally oscillating interchanger.

The scattering effect of the first scattering element SE1 is constant over the area thereof in an exemplary of the disclosure.

The first scattering element is advantageously more cost-effective. A speckle reduction can be carried out by a more cost-effective rotation.

The scattering effect of the first scattering element SE1 varies over the area thereof in an exemplary embodiment of the disclosure.

A change in the effect over the first beam cross section is advantageously possible. Advantageously, the scattering effect is changeable by a lateral displacement or rotation of the first scattering element SE1.

The scattering effect of the first scattering element SE1 is embodied as at least two disjoint regions with a different scattering effect over the area thereof in an exemplary embodiment of the disclosure.

The disjoint regions that do not intersect each have a different scattering effect. Advantageously, the first scattering element SE1 can be used in space-saving fashion in relation to an interchanger with separate inserts for different scattering elements.

In an exemplary embodiment of the disclosure, the scattering effect of the first scattering element SE1 over the area of said scattering element in a two-dimensional zone is embodied along one direction as an effect profile between a smallest and a greatest effect.

Advantageously, a change in the scattering effect over the area is achievable. Moreover, a different effective range between the smallest and the greatest effect is adjustable by a lateral displacement of the first scattering element SE1. The effect profile can be linear such that a continuous change in scattering effect is achievable. The two-dimensional zone can be embodied as a rectangle such that a change in the scattering effect from one end of the beam cross section to the other end of the beam cross section is definable.

In an exemplary embodiment of the disclosure, the scattering effect of the first scattering element SE1 over the area of said scattering element is embodied as an annular region with an azimuthal effect profile between a smallest and a greatest effect.

The azimuthal effect profile can be linear. Advantageously, a continuous change in the scattering effect is achievable by way of a rotation of the first scattering element SE1. In a first variant, the resultant axis of rotation can lie at the center of the beam cross section. In a second variant, the axis of rotation can lie outside of the beam cross section.

In an exemplary embodiment of the disclosure, the scattering effect of the first scattering element SE1 over the area of said scattering element is embodied as a plurality of concentric disjoint annular regions with different smallest and greatest effects and with an azimuthal effect profile between a smallest and a greatest effect in each case.

Advantageously, a continuous change in the scattering effect is achievable, wherein there simultaneously is a change in effect from the center to the edge region of the first beam cross section.

In an exemplary embodiment of the disclosure, the first dimension L1 of the first beam cross section in the first plane has a value in the range of between 0.1 mm and 5 mm.

Advantageously, this value for the first dimension L1 sets the smallest achievable second numerical aperture NA(SE2) together with the focal length f of the collector optical device OS1.

In an exemplary embodiment of the disclosure, the first dimension L1 of the first beam cross section in the first plane has a value in a range of between 0.1 mm and 3 mm, typically in a range of between 0.1 mm and 2 mm, further typically in a range of between 0.1 mm and 1.0 mm.

Advantageously, this value for the first dimension L1 sets the smallest achievable second numerical aperture NA(SE2) together with the focal length f of the collector optical device OS1. In an exemplary embodiment, the first dimension L1 can have a value of 0.3 mm or 0.5 mm.

In an exemplary embodiment of the disclosure, the first beam cross section has a circular embodiment.

Advantageously, the first beam cross section is rotationally symmetric. As a result, the second beam cross section on the second scattering element SE2 is also rotationally symmetric.

In an exemplary embodiment of the disclosure, the first scattering element SE1 is arranged on an interchanger, wherein the interchanger includes at least two first scattering elements SE1 that each have a different scattering effect.

Advantageously, the first scattering element SE1 can be exchanged for at least one other scattering first element with a different scattering effect. A different first numerical aperture NA(SE1) is adjustable by the change. Advantageously, this also allows the second beam cross section on the second scattering element SE2 to be set. This is an option for setting the etendue in the first illuminated field.

The collector optical device OS1 is formed by a single lens in an exemplary embodiment of the disclosure.

A compact arrangement of the light source device is possible. There can be a small distance between the first scattering element SE1 and the second scattering element SE2 as a result of a single lens collector optical device OS1.

The collector optical device OS1 has an aspherical embodiment in an exemplary embodiment of the disclosure.

Advantageously, imaging aberrations can be reduced or even be avoided.

According to an exemplary embodiment of the disclosure, the collector optical device OS1 includes at least two lenses, wherein the focal length of the collector optical device OS1 has a fixed value.

The collector optical device OS1 has a multi-lens embodiment with a fixed focal length. The collector optical device OS1 can be formed without aspherical lenses while still having a good imaging quality, and it is nevertheless relatively compact.

The collector optical device OS1 includes at least two lenses in an exemplary embodiment of the disclosure such that the focal length of the collector optical device OS1 is variably adjustable.

The collector optical device OS1 has a multi-lens embodiment with a variable focal length. The size of the second beam cross section in the second plane on the second scattering element SE2 is adjustable. There can be a continuous adaptation of the second beam cross section in the case of a variable focal length change.

An afocal zoom system is arranged between the collector optical device OS1 and the second scattering element SE2 in an exemplary embodiment of the disclosure.

The afocal zoom system forms a variable optical device that is arranged on the optical axis between the collector optical device OS1 and the second scattering element SE2. The variable optical device is also referred to as a varifocal objective lens. The combination of the collector optical device OS1 with the fixed focal length and an afocal zoom system forms one exemplary embodiment of a multi-lens collector optical device OS1 with a variable focal length.

The second scattering element SE2 is a diffusion screen in an exemplary embodiment of the disclosure. A diffusion screen is economical.

The second scattering element SE2 is a diffractive optical element in an exemplary embodiment of the disclosure.

The scattering behavior can be structured using a diffractive optical element (DOE). The angle distribution can be influenced in targeted fashion. The diffractive optical element can be designed in such a way that the homogeneous distribution is effected. A center-weighted distribution can also be set in one exemplary embodiment.

The second scattering element SE2 is formed by a microlens array in an exemplary embodiment of the disclosure.

Advantageously, a very homogeneous distribution can be effected by a microlens array.

The second scattering element SE2 is formed by a honeycomb condenser in an exemplary embodiment of the disclosure.

Advantageously, a very homogeneous distribution can be effected by a honeycomb condenser. A honeycomb condenser can represent a special form of a microlens array.

The scattering effect of the second scattering element SE2 is constant over the area thereof in an exemplary embodiment of the disclosure.

The second scattering element is advantageously cost-effective.

The scattering effect of the second scattering element SE2 is different over the area thereof in an exemplary embodiment of the disclosure.

A change in the effect over the second beam cross section is possible. The scattering effect is changeable by a lateral displacement or rotation of the second scattering element SE2.

The scattering effect of the second scattering element SE2 is embodied as at least two disjoint regions with a different scattering effect over the area thereof in an exemplary embodiment of the disclosure.

The disjoint regions that do not intersect each have a different scattering effect. Advantageously, the second scattering element SE2 can be used in space-saving fashion in relation to an interchanger with separate inserts for different scattering elements.

In an exemplary embodiment of the disclosure, the scattering effect of the second scattering element SE2 over the area of said scattering element in a two-dimensional zone is embodied along one direction as an effect profile between a smallest and a greatest effect.

Advantageously, a change in the scattering effect over the area is achievable. Moreover, a different effective range between the smallest and the greatest effect is adjustable by a lateral displacement of the second scattering element SE1. The effect profile can be linear such that a continuous change in scattering effect is achievable. The two-dimensional zone can be embodied as a rectangle such that a change in the scattering effect from one end of the beam cross section to the other end of the beam cross section is definable.

In an exemplary embodiment of the disclosure, the scattering effect of the second scattering element SE2 over the area of said scattering element is embodied as an annular region with an azimuthal effect profile between a smallest and a greatest effect.

The azimuthal effect profile can be linear. Advantageously, a continuous change in the scattering effect is achievable by way of a rotation of the second scattering element SE2. In a first variant, the axis of rotation can lie at the center of the beam cross section. In a second variant, the axis of rotation can lie outside of the beam cross section.

In an exemplary embodiment of the disclosure, the scattering effect of the second scattering element SE2 over the area of said scattering element is embodied as a plurality of concentric disjoint annular regions with different smallest and greatest effects and with an azimuthal effect profile between a smallest and a greatest effect in each case.

Advantageously, a continuous change in the scattering effect is achievable, wherein there simultaneously is a change in effect from the center to the edge region of the first beam cross section.

In an exemplary embodiment of the disclosure, the second scattering element SE2 is arranged on an interchanger, wherein the interchanger includes at least two second scattering elements SE2 that each have a different scattering effect.

Advantageously, the second scattering element SE2 can be exchanged for at least one other second scattering element with a different scattering effect. A different second numerical aperture NA(SE2) is adjustable by the change. This is an option for setting the etendue in the first illuminated field.

In an exemplary embodiment of the disclosure, an imaging optical device is arranged downstream of the second scattering element SE2 in the beam path.

Advantageously, an imaging optical device is arranged in the optical beam path downstream of the second scattering element, i.e., along the further course of the illumination beam path along the optical axis between the second scattering element and a light source output plane. The imaging optical device brings about an adaptation of the first illuminated field to a light source output plane. The first illuminated field, or the far field thereof, can be imaged into the light source output plane by way of the imaging optical device. A light guide or an optical fiber bundle can be arranged in the light source output plane.

In an exemplary embodiment of the disclosure, the imaging optical device is embodied as a finite imaging optical device that images the first illuminated field into a light source output plane with an imaging scale beta.

The imaging optical device images the first illuminated field into the light source output plane. The imaging scale beta can have a positive or negative sign. The imaging optical device converts the first illuminated field into a scaled illuminated field in the light source output plane. The scaled illuminated field has an extent or dimension that has been modified by a factor of |beta| (absolute value of beta) and a numerical aperture that has been modified by a factor of |1/beta| (absolute value of 1 divided by beta) in relation to the first illuminated field. Since an extent or dimension always has a positive value, the absolute value of beta is specified. The imaging optical device forms an option for transporting the light of the first illuminated field to the location of the light source output with an unchanged etendue such that it can be efficiently received there by a subsequent optical device or a light guiding element with an etendue that is greater or equal to that of the first illuminated field.

The imaging optical device is formed as an imaging optical device that is telecentric on both sides in an exemplary embodiment of the disclosure.

This is advantageous for coupling relatively small numerical apertures into an illumination optical device or into a light guide or into an optical fiber bundle in the light source output plane at the light source output. Here, the entry pupil of the illumination optical device or a light entry plane of the light guide or of the optical fiber bundle can coincide with the light source output plane.

In an exemplary embodiment of the disclosure, the finite imaging optical device has a reducing scale, wherein the absolute value of beta lies in a range between greater than or equal to 0.1 and less than or equal to 0.5.

Advantageously, the imaging of the cross section of the first illuminated field onto a light guide arranged at the light source output or onto a light guide bundle arranged there is optimal. If the beam cross section of the first illuminated field is round, there is an imaging of the illuminated field diameter onto a round diameter in the light source output plane. By way of example, the diameter of the light guide or of the light guide bundle is 5 mm.

The imaging optical device is formed as a collimating imaging optical device in an exemplary embodiment of the disclosure.

A collimating imaging optical device advantageously allows the far field of the first illuminated field to be imaged into the light source output plane with an unchanged etendue.

In an exemplary embodiment of the disclosure, the collimating imaging optical device includes a second collector optical device with a second focal length f2.

The second collector optical device with a second focal length f2 images the far field of the first illuminated field into a light source output plane. Advantageously, a second collector optical device with the focal length f2 is arranged in the optical beam path downstream of the second scattering element, i.e., along the further course of the illumination beam path along the optical axis between the second scattering element and the light source output plane. The second collector optical device collimates the first illuminated field and images the far field thereof (angle distribution) into the light source output plane as a transformed illuminated field. The third dimension L3, or the diameter in the case of a round beam cross section, of the transformed illuminated field can be set in this case by way of the second numerical aperture NA(SE2) of the first illuminated field and has the value of: $L3=2 \times f2 \times NA(SE2)$.

The numerical aperture of the transformed illuminated field can be set by way of the second dimension L2 on the second scattering element, or of the first illuminated field, and has the value of: $NA(L2)=(L2/2/f2)$. The second collimator optical device forms a further option for transporting the light of the first illuminated field to the location of the light source output with an unchanged etendue such that it can be efficiently received there by a subsequent optical device or a light guiding element with an etendue that is greater or equal to that of the first illuminated field.

In an exemplary embodiment of the disclosure, the second collector optical device has a collimating embodiment and has a second focal length f2, the latter lying in a range of between 8 mm and 30 mm.

Advantageously, the imaging of the maximum numerical aperture NAmax(SE2) of the first illuminated field cross section, or of the illuminated field diameter in the case of a round cross section, onto a light guide or light guide bundle arranged at the light source output is optimal. By way of example, the diameter of the light guide or of the light guide bundle at the light source output is 5 mm.

In an exemplary embodiment of the disclosure, an optical input coupling element is arranged downstream of the second scattering element SE2.

Advantageously, the illumination light of another light source can be coupled into the beam path in addition to the illumination light of the first illuminated field.

In an exemplary embodiment of the disclosure, the imaging optical device includes at least two optical elements and an optical input coupling element is arranged between the at least two optical elements.

Advantageously, the illumination light of a further light source can be coupled into the beam path in addition to the illumination light of the first illuminated field. A more compact design is achievable. A further advantage lies in the fact that the field correction is simplified if the first optical element of the imaging optical device can be arranged close to the second scattering element SE2.

In an exemplary embodiment of the disclosure, an optical input coupling element is arranged downstream of the second scattering element SE2 such that the first illuminated field and a second illuminated field of a second illumination beam path are couplable and the coupled illumination light is guided to the light source output plane in a common beam path downstream of the input coupling element.

This allows two different illumination light sources to be coupled. According to an aspect of the disclosure, the illumination light of the light source device is couplable with another light source. The illumination light of the two light sources is represented by the first illuminated field and the second illuminated field in each case. The illumination light of the two illuminated fields is coupled by the coupling element. The sum of the wavelength ranges of the two light sources is available at the light source output plane. The coupled illumination light can be coupled into an illumination optical device, for example a light guide or an optical fiber bundle, and can be guided together to an object plane.

The second illuminated field is the illuminated field of a white light source in an exemplary embodiment of the disclosure.

Advantageously, the illumination light of a white light source can be coupled with the illumination light of the laser light source and can be guided to the observation region with the object plane in a common beam path. The illumination light for exciting fluorescence is couplable to a white light illumination. The illuminated field on the light source output includes the constant second illuminated field of the white light source and the monochromatic first illuminated field of the laser light source, said first illuminated field being variable in terms of extent and numerical aperture. Advantageously, the intensity of both light sources can be controlled independently of one another. An intensity can also be controlled over time; by way of example, one or both light sources may be pulsed.

The second illuminated field is the illuminated field of a laser light source in an exemplary embodiment of the disclosure.

Advantageously, two laser light sources can be combined. The two laser light sources may have different multiple wavelengths.

The laser light source is a single mode laser in an exemplary embodiment of the disclosure.

A single mode laser produces more pronounced speckle effects than other laser types. This is advantageous if an observation method that is based on speckles is used.

The laser light source is a multi-mode laser in an exemplary embodiment of the disclosure.

A multi-mode laser has a higher power output. The power is higher than in the case of single mode lasers. A multi-mode laser produces less pronounced speckle effects than a single mode laser.

In an exemplary embodiment of the disclosure, the laser light source is a multi-mode laser with a beam quality factor $M^2$ in a range of between 30 and 50.

Advantageously, a high luminous power is available with small spectral effects.

In an exemplary embodiment of the disclosure, the laser light source has a central wavelength from the group of 405 nm, 450 nm, 750 nm, and 800 nm.

These wavelengths are particularly well suited to excite fluorescence. Advantageously, the wavelength can be adapted to the field of application.

The laser light source has a central wavelength in a range of between 390 nm and 470 nm in an exemplary embodiment of the disclosure.

Advantageously, a fluorescence excitation in the wavelength range of near UV can be brought about.

The laser light source has a central wavelength in a range of between 400 nm and 450 nm in an exemplary embodiment of the disclosure.

Advantageously, a fluorescence excitation in the wavelength range of near UV can be brought about.

The central wavelength of the laser light source is 407 nm in an exemplary embodiment of the disclosure.

This wavelength is particularly well suited to excite fluorescence.

The laser light source has a central wavelength in a range of between 700 nm and 850 nm in an exemplary embodiment of the disclosure.

Advantageously, a fluorescence excitation in the wavelength range of near infrared can be brought about.

In an exemplary embodiment of the disclosure, the laser light source includes at least two laser light source modules, the laser light of which is guided in unified fashion to the first scattering element SE1.

The at least two lasers can be activated individually in each case or together. This allows the luminous power to be increased and/or the wavelength range to be extended.

In an exemplary embodiment of the disclosure, the laser light source includes at least two laser light source modules that emit laser light in the same wavelength range.

This advantageously allows the addition of luminous power in a wavelength range.

In an exemplary embodiment of the disclosure, the laser light source includes at least two laser light source modules that emit laser light in a different wavelength range.

At least two different excitation wavelengths are advantageously available. To this end, the at least two laser light source modules can be activated individually in each case or together.

The laser light of at least two laser light source modules is coupled by a beam splitter in an exemplary embodiment of the disclosure.

Advantageously, a beam splitter is advantageous for the input coupling of the laser light of a further laser source in the case of an arrangement of the lasers at an angle position, in particular a 90° position.

The laser light of at least two laser light source modules is coupled by a fiber coupler in an exemplary embodiment of the disclosure.

Advantageously, the laser light of the at least two lasers can be coupled in space-saving fashion. The lasers can be arranged at any angle position, also parallel to one another.

In an exemplary embodiment of the disclosure, the emitted laser light of the at least two laser light source modules is focused onto the first scattering element SE1 by a focusing element.

Advantageously, the at least two laser light source modules can be arranged in collimated fashion.

At least four laser light source modules are arranged in square or cruciform fashion in an exemplary embodiment of the disclosure.

The laser light source is advantageously compact.

At least five laser light source modules are arranged in ring-shaped fashion around an optical axis in an exemplary embodiment of the disclosure.

Advantageously, the angle of incidence on the first scattering element SE1 is the same for all laser light source modules.

At least five laser light source modules are arranged in ring-shaped fashion in an exemplary embodiment of the disclosure, wherein one laser light source module is arranged on the optical axis.

The laser light source is advantageously compact.

In an exemplary embodiment of the disclosure, the laser light source includes at least two laser light source modules with different central wavelengths from the group of 405 nm, 450 nm, 750 nm and 800 nm.

These wavelengths are particularly well suited to excite fluorescence. Advantageously, the wavelength is adaptable to the field of application.

In an exemplary embodiment of the disclosure, the laser light source includes at least two laser light source modules with different central wavelengths, wherein a first laser light source module has a wavelength in the range of between 390 nm and 470 nm and a second laser light source module has a wavelength in a range of between 700 nm and 850 nm.

Advantageously, this can bring about fluorescence excitations in the near UV and in the near infrared.

A light guide or an optical fiber bundle is arranged in the light source output plane in an exemplary embodiment of the disclosure.

Advantageously, the illumination light of the light source is couplable into a light guide or an optical fiber bundle.

A structured light guide or a structured optical fiber bundle is arranged in the light source output plane in an exemplary embodiment of the disclosure.

A structured light guide or structured optical fiber bundle is particularly advantageous if the subsequent illumination beam path is embodied as a spot illumination beam path. Then, the extent of the illuminated field in the object plane can be set by suitably setting numerical aperture and extent, or dimension, of the resultant illuminated area at the light source output in the light source output plane. The concentration of the illumination light in the object plane is adjustable in the light source device.

An optical fiber bundle forming a multi-region light guide or multi-region optical fiber bundle is arranged in the light source output plane in an exemplary embodiment of the disclosure.

A multi-region optical fiber bundle includes at least two delimited regions, each with incoherent optical fibers. A multi-region light guide or a multi-region optical fiber bundle represents a simplified and more cost-effective alternative to coherent light guides or optical fiber bundles.

An optical fiber bundle having at least two delimited regions with incoherent optical fibers in each case is arranged in the light source output plane in an exemplary embodiment of the disclosure.

This embodiment is cost-effective and particularly advantageous if the subsequent illumination beam path is embodied as a spot illumination beam path. Then, the extent of the illuminated field in the object plane can be set by suitably setting numerical aperture and extent, or dimension, of the resultant illuminated area at the light source output in the light source output plane. The concentration of the illumination light in the object plane is adjustable in the light source device.

In an exemplary embodiment of the disclosure, the optical fiber bundle includes at least two delimited regions with incoherent optical fibers in each case, wherein the at least two delimited regions have a concentric arrangement.

This embodiment is easily producible and cost-effective.

In an exemplary embodiment of the disclosure, the optical fiber bundle includes at least two delimited regions, wherein every optical fiber in a region has the same configuration.

The optical fibers having the same configuration means that these are all the same in terms of form, cross section and the optical properties, for example for the value of the numerical aperture. Hence, the optical fiber bundle is cost-effective.

In an exemplary embodiment of the disclosure, a surgical microscope with an illumination beam path includes a light source device according to the disclosure.

Advantageously, the light source device can be connected to the illumination beam path of a surgical microscope without having to change the illumination beam path in the surgical microscope. Hence, the light source according to an aspect of the disclosure can be coupled to an existing light source or can replace an existing light source device.

The illumination beam path of the surgical microscope forms a Köhler illumination in an exemplary embodiment of the disclosure.

The illumination beam path of the surgical microscope forms a Köhler illumination or a Köhler-type illumination. Advantageously, the light source device is embodied in such a way that the latter, in conjunction with a Köhler illumination beam path in a surgical microscope, achieves a very good illumination light quality in the object plane. Controlling an illuminated field diameter in the object field, or in the object plane, of the surgical microscope can advantageously be implemented by setting or varying the numerical aperture at the light source output.

In the case of the Köhler illumination, the front beam path of the illumination optical device collimates the light from the entry pupil and images the far field thereof onto a first illuminated field plane E1. The entry pupil defines input of the illumination optical device and may be formed by the end of a light guide or of an optical fiber bundle, wherein the input of the light guide is arranged in the light source output plane. The first illuminated field plane E1 lies conjugate to the illuminated object plane along a subsequent beam path. The illuminated object plane forms a second illuminated field plane E2.

A change in the numerical aperture of the light source device at the light source output has an effect on the illuminated field in the object plane. If the arising illuminated field on the first illuminated field plane E1 is reduced in terms of its size, there is also a reduction in the size of the second illuminated field in the object plane. The size of the first illuminated field on the first illuminated field plane E1 is proportional to the numerical aperture of the light from the exit pupil. Therefore, a light concentration in the object plane can advantageously be brought about in the case of the Köhler illumination or a Köhler-type illumination optical device by reducing the numerical aperture from the light source device.

Advantageously, the light source device according to the disclosure provides the option of being able to reduce the numerical aperture at the output down to a minimal value without increasing the extent of the illuminated field at the light source output in the light source output plane in the process. As a result, vignetting losses at the light source output or in the subsequent illumination system are avoided. Overall, the illumination apparatus has a high effectiveness. In the ideal case, the light concentration maintains luminous flux.

The illumination beam path of the surgical microscope is configured as a spot illumination beam path in an exemplary embodiment of the disclosure.

In the case of a spot illumination beam path, an illuminated field stop plane with an optional illuminated field stop is irradiated in uncollimated fashion from each point of the light source and imaged into the conjugate illuminated field plane by a lens or a lens system with positive refractive power. By way of example, a light source can be located at a distance directly in front of the illuminated field stop. In one embodiment, the illuminated field stop can initially be imaged to infinity by a collector and then be imaged by an objective lens into the focal plane thereof as an illuminated field. In this illumination optical device type, diameter and numerical aperture of the light source have an influence on the illuminated region of the illuminated field. A simultaneous reduction in diameter and aperture of the light source is particularly advantageous for a significant light concentration.

Advantageously, the light source device is embodied in such a way that the latter, in conjunction with a spot illumination beam path in a surgical microscope, achieves a very good illumination light quality in the object plane. Controlling an illuminated field diameter in the object field, or in the object plane, of the surgical microscope can advantageously be implemented by setting the numerical aperture and the illuminated field diameter at the light source output.

A light guide or an optical fiber bundle is arranged between the light source output and the illumination beam path of the surgical microscope in an exemplary embodiment of the disclosure.

Advantageously, the light source can be arranged at a further distance from the surgical microscope. This saves installation space in the surgical microscope and reduces a possible thermal load resulting from an illumination light source in the surgical microscope.

BRIEF DESCRIPTION OF THE DRAWINGS

The disclosure will now be described with reference to the drawings wherein:

FIG. 4A shows a schematic illustration of an illumination device for a surgical microscope with a laser light source with an afocal zoom system in a first zoom setting and an imaging optical device that is telecentric on both sides and that has an imaging scale beta according to a third exemplary embodiment of the disclosure;

FIG. 4B shows the third exemplary embodiment according to FIG. 4A in a second zoom setting of the afocal zoom system;

FIG. 5A shows a schematic illustration of an illumination device for a surgical microscope with a laser light source with an afocal zoom system in a first zoom setting and a collimating imaging optical device according to a fourth exemplary embodiment of the disclosure;

FIG. 5B shows the fourth exemplary embodiment according to FIG. 5A in a second zoom setting of the afocal zoom system;

FIG. 8C shows four exemplary embodiments of an arrangement of laser light source modules perpendicular to an optical axis;

FIG. 9B shows the use of a two-region fiber bundle according to FIG. 9A.

DESCRIPTION OF EXEMPLARY EMBODIMENTS

Figure 1:
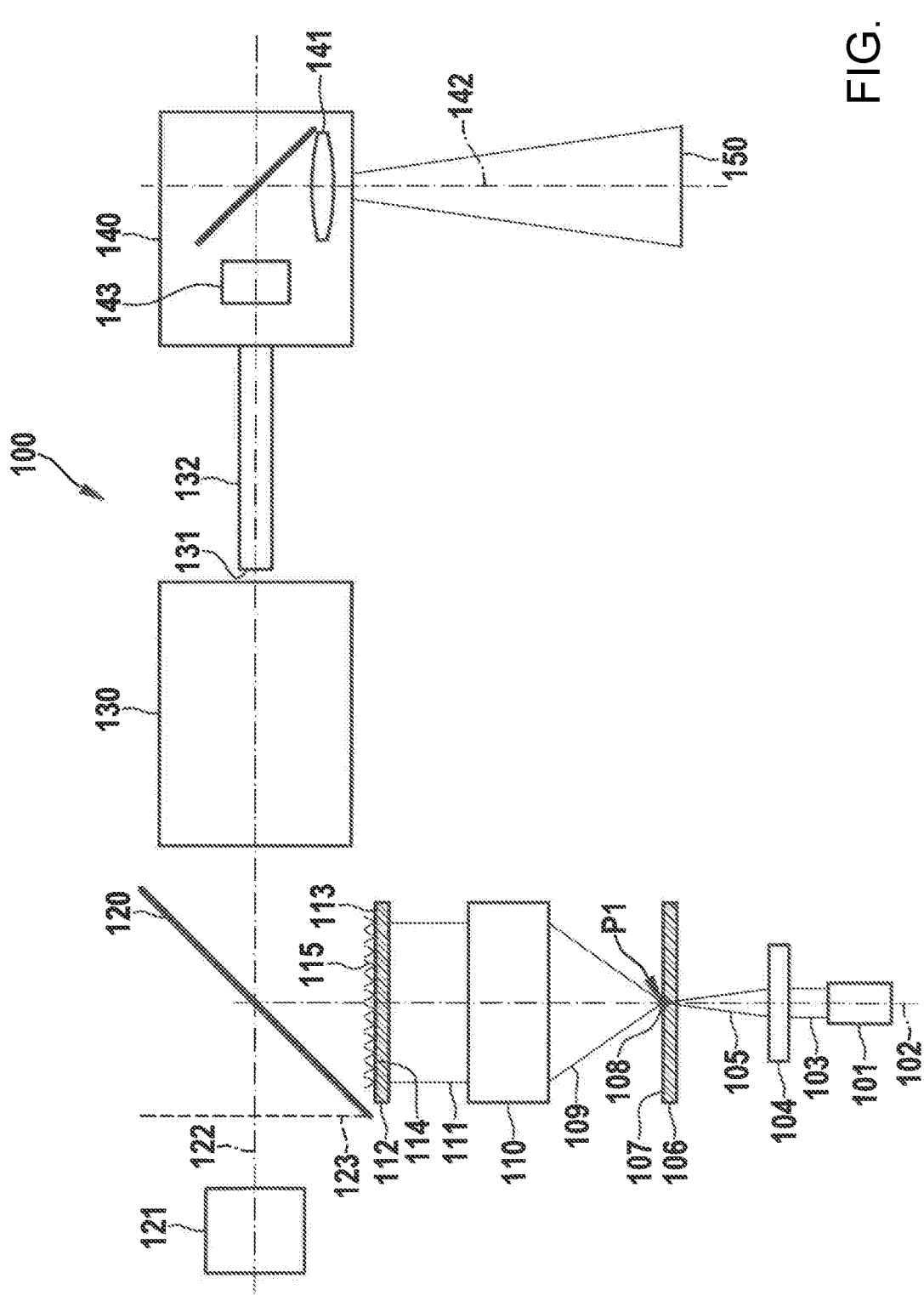
FIG. 1 shows a schematic illustration of an illumination apparatus for a surgical microscope with a laser light source according to a first exemplary embodiment of the disclosure.

FIG. 1 shows a schematic illustration of a first exemplary embodiment of an illumination apparatus 100 for a surgical microscope with a laser light source.

A laser light source 101 is arranged along a first optical axis 102. The laser light source 101 includes a collimator optical device. The collimated laser light 103 emitted by the laser light source 101 with the collimator optical device is focused by way of a focusing optical device 104 onto a first scattering element SE1, which is denoted by the reference sign 106. The first scattering element SE1 106 is formed by a first diffusion screen. Focused laser light 105 forms a first beam cross section 108 with a first dimension L1 in a first plane 107 on the first scattering element SE1 106. The beam cross section is round; therefore, the first dimension L1 can be specified by the diameter of the focused light spot. The diameter of the first beam cross section 108 has a value of approximately 0.3 mm.

A collector optical device OS1, denoted by the reference sign 110, is arranged downstream of the first scattering element SE1 106 along the first optical axis 102. The collector optical device OS1 110 has a focal length $f_{OS1}$ and a first focus P1.

The center of the focused laser light in the first plane on the first scattering element SE1 106 lies on the front first focus P1 of the collector optical device OS1 110. The scattered light is emitted into a solid angle by the scattering effect of the first scattering element SE1 106 and a fanned first scattered beam 109 with a first numerical aperture NA(SE1) is formed, which is imaged in a manner collimated by the collector optical device OS1 110 onto a second scattering element SE2 112.

The second scattering element SE2 112 is formed by a second diffusion screen. The collector optical device OS1 110 images the beam emanating from the first scattering element SE1 106 at infinity. The beam is guided in a collimated beam path 111 downstream of the collector optical device OS1 110. In a second plane 113, at the location of the second scattering element SE2 112, the beam is well collimated as a result of the small extent of the first beam cross section 108 in the first plane 107 in relation to the focal length fOS1 of the collector optical device OS1 110.

On the second scattering element SE2 112, in the second plane 113, the collimated illumination light has a significantly larger second beam cross section with the second dimension L2.

The second beam cross section with the second dimension L2 depends on the scattering angle range of the first diffusion screen SE1 106 and the focal length f of the collector optical device OS1 110. The beam cross section in the second plane 113 is round; therefore, the second dimension L2 has the value of the diameter of the beam cross section. At the location of the second scattering element SE2 112, the second beam cross section has the same cross section as the collimated beam path 111.

The collimated beam produces a large number of small light centers in the second plane 113 on the second scattering element SE2 112, said light centers each emitting a scattered beam into a solid angle range. Consequently, at each point in the second beam cross section in the second plane 113 of the second scattering element SE2 112, the scattering effect of the second scattering element SE2 112 produces a beam of emitted illumination light with a second numerical aperture NA(SE2) in each case. These beams of the illumination light are denoted by the reference sign 115.

The illumination light emanating from the second scattering element SE2 112 forms a first illuminated field LF1 114. The first illuminated field LF1 114 has the size of the second beam cross section.

The light emanating from the second scattering element SE2 112 is coupled into the beam path of a second light source 121 with a second optical axis 122 in a deflection direction via an optical input coupling element OEE 120. A second illuminated field LF2 of the second light source 121 is denoted by the reference sign 123. By way of example, the second illuminated field LF2 123 can be formed by a honeycomb condenser output of an LED white light source. The light emanating from the second illuminated field LF2 123 is guided through the optical input coupling element OEE 120 in the pass direction.

The first illuminated field LF1 114 has a different spectral distribution to the second illuminated field LF2 123. Consequently, the optical input coupling element OEE 120 couples the illumination light from two different directions with different spectral distributions into a common beam path with the second optical axis 122.

The second illuminated field LF2 123 is the illuminated field of a white light source. The first illuminated field LF1 114 includes a wavelength range that is suitable for the fluorescence analysis. To this end, the laser light source 101 emits laser light with a central wavelength in the range of 390 nm to 450 nm. In an alternative embodiment, the laser light source 101 emits laser light with a central wavelength in the range of 700 nm to 850 nm. The emitted wavelength depends on the intended use of the surgical microscope. By way of example, the first illuminated field LF1 114 emits a spectrum with a central wavelength of 407 nm. This wavelength is particularly well suited to excite fluorescence. The laser light source 101 is a collimated multi-mode laser. The laser light source 101 is a collimated single mode laser in an alternative embodiment.

Downstream of the optical input coupling element OEE 120, the illumination light is guided by an imaging optical device 130 onto a light source output plane 131, which lies on the second optical axis 122. The input of a light guide 132 is arranged in the light source output plane 131. The light guide 132 is guided to a surgical microscope 140. The light guide 132 is formed by an optical fiber bundle in an alternative embodiment.

As a result of its scattering effect, the second scattering element SE2 112 increases the numerical aperture of the light in the case of an unchanging beam cross section. The illumination light 115 emanating from the second scattering element SE2 112 is scaled in its extent by the absolute value of the imaging scale of the imaging optical device 130 and imaged on the subsequent light source output plane 131 with its numerical aperture scaled by a factor of "1/absolute value of the imaging scale". The imaging scale of this imaging is definable by the imaging optical device 130. Then, the third beam cross section and the third numerical aperture in the light source output plane 131 are also determined by the second beam cross section and the second numerical aperture on the second scattering element SE2 112.

The surgical microscope 140 includes a main objective lens 141, an optical observation device, not illustrated, with a third optical axis 142 and an illumination optical device 143. The illumination light emanating from the light guide 132 is guided in the surgical microscope 140 to an object plane 150 through the illumination optical device 143. Here, the illumination light can be guided in coaxial fashion in relation to the third optical axis 142 of the observation device. In an alternative exemplary embodiment, the illumination light is guided to the object plane 150 at an angle to the third optical axis 142.

The surgical microscope 140 is configured such that the illumination beam path and the observation beam path of the observation device are guided together through the main objective lens 141. The illumination beam path and the observation beam path of the observation device form completely separated beam paths in one embodiment. The illumination apparatus 100 can be used to illuminate the object plane 150 in both embodiments.

By adapting the scattering effect of the first scattering element SE1 106, the first numerical aperture NA(SE1) is adjustable and consequently, by way the focal length $f_{OS1}$ of the collector optical device OS1 110, the dimension L2, or the diameter, of the second beam cross section is also adjustable in the second plane 113 at the location of the second scattering element SE2 112. Together with the focal length $f_{OS1}$ of the collector optical device OS1 110, the first beam cross section with the first dimension L1 of the focused laser light in the first plane 107 of the first scattering element SE1 sets the minimal achievable value NAmin (SE2) of the numerical aperture NA(SE2) at the location of the second scattering element SE2 112. The minimum achievable etendue LLWmin(SE2) at the location of the second scattering element SE2 112 equals L2×NAmin(SE2).

By adapting or changing the scattering effect the second scattering element SE2 112, the second numerical aperture NA(SE2) downstream of the second scattering element SE2 can be adapted or increased in targeted fashion, and hence it is possible to change the etendue in the first illuminated field LF1 114 from a minimum of L2×NAmin(SE2) to the value of L2×NA(SE2). This can be implemented with the first scattering element SE1 106 and the second scattering element SE2 112 with a small change in the effectiveness while having a high transmission.

The illuminated field of the light source output in the light source output plane 131 includes the constant second illuminated field LF2 123 of the white light source 121 and the monochromatic first illuminated field LF1 114 of the laser light source 101, said first illuminated field being variable in terms of extent and numerical aperture. Advantageously, the intensity of both light sources can be controlled independently of one another. The laser light source 101 with the focusing optical device 104, the first scattering element SE1

106, the collector optical device OS1 110 and the second scattering element SE2 112 forms a modular and functional light source device, which can be coupled in a modular fashion to the white light source by the optical input coupling element OEE 120. The input coupling has no adverse effect on the white light illumination. Advantageously, the brightness and the illuminated field diameter of the laser light illumination in the object plane 150 are controllable independently of the white light illumination. Advantageously, the brightness of the laser light illumination can be pulsed in the object plane 150, independently of the white light illumination.

The surgical microscope 140 can be a conventional optical surgical microscope including eyepieces and one or more cameras. An observation device of the surgical microscope 140 can also be formed by a digital image capture system comprising a camera and an optical device. The observation device of the surgical microscope 140 can also be formed only by a camera. In an alternative implementation, the surgical microscope 140 can also form a hybrid system, i.e., a mixture of a conventional optical surgical microscope, which includes a main objective and a magnification optical device, and a digital surgical microscope.

The illumination beam path of the surgical microscope 140 can be configured as a Köhler illumination or Köhler illumination beam path. This renders a very good illumination light quality achievable in the object plane 150. Controlling an illuminated field diameter in the object plane 150 of the surgical microscope 140 can advantageously be implemented by setting or varying the numerical aperture at the light source output in the light source output plane 131.

The illumination beam path of the surgical microscope 140 is configured as a spot illumination beam path in an alternative exemplary embodiment. Also in conjunction with a spot illumination beam path in a surgical microscope 140, the light source device achieves a very good illumination light quality in the object plane 150. The illuminated field diameter in the object plane 150 of the surgical microscope 140 is adjustable by adapting the numerical aperture and the illuminated field diameter at the light source output in the light source output plane 131.

The first scattering element SE1 106 carries out a rotating movement in an alternative exemplary embodiment. The first scattering element SE1 106 is arranged so as to laterally oscillate in the first plane in a further alternative embodiment. Speckle patterns are averaged out over time and reduced in both embodiments.

Figure 2:
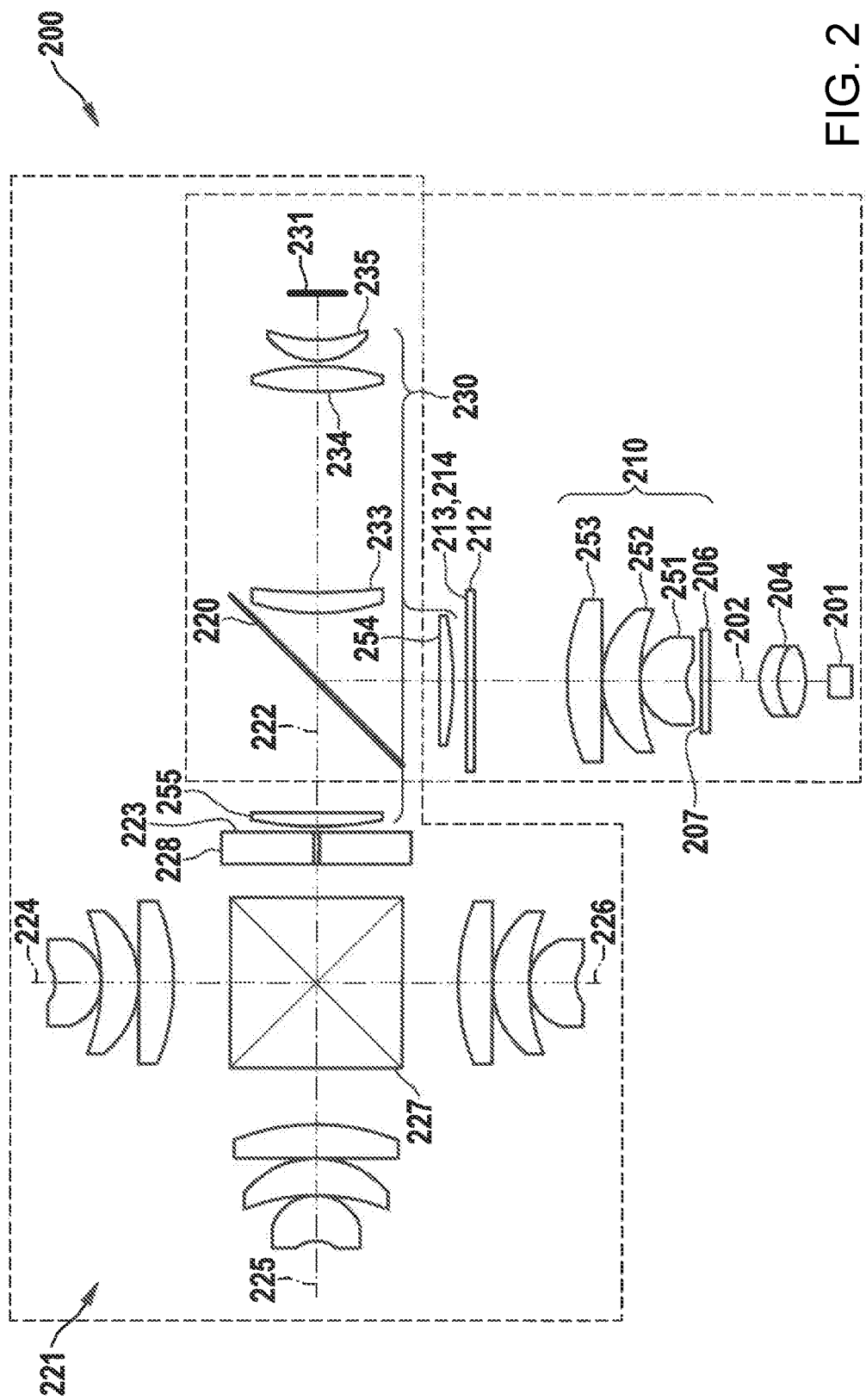
FIG. 2 shows a schematic illustration of an illumination device for a surgical microscope with a laser light source and an RGB white light source according to a second exemplary embodiment of the disclosure.

FIG. 2 shows a schematic illustration of a second exemplary embodiment of an illumination device 200 for a surgical microscope with a laser light source and an RGB white light source.

FIG. 2 shows the same components as the illumination apparatus in accordance with FIG. 1, with the reference signs being increased by 100. FIG. 2 shows a more detailed illustration and includes additional elements.

The laser light emitted by a collimated laser light source 201 along an optical axis 202 is focused by a focusing optical device 204 onto the first scattering element SE1 206, a first diffusion screen. The focused laser light is imaged by way of a collector optical device OS1 210 onto a second scattering element SE2 212, a second diffusion screen. The collector optical device OS1 210 includes a first collector lens 251, a second collector lens 252 and a third collector lens 253. The collector optical device OS1 210 advantageously has an aplanatic design in an exemplary embodiment. These three collector lenses of the collector optical device OS1 210 form a principal plane with a focal length fOS1 and a first focus P1. The collector optical device OS1 210 images the beam emanating from the first scattering element SE1 206 at infinity. The first focus P1 of the collector optical device OS1 210 lies in the center of the focused laser light in a first plane 207 on the first scattering element SE1 206. The laser light is scattered into a solid angle with a first numerical aperture NA(SE1) by the scattering effect of the first scattering element SE1 206 and imaged in a manner collimated by the collector optical device OS1 210 onto the second scattering element SE2 212.

In a second plane 213, at the location of the second scattering element SE2 212, the beam is very well collimated as a result of the small extent of the beam cross section in the first plane 207B in relation to the focal length fOS1 of the collector optical device OS1 210. Consequently, at each point in the second beam cross section in the second plane 213 of the second scattering element SE2 212, the scattering effect of the second scattering element SE2 212 produces a beam of emitted illumination light with a second numerical aperture NA(SE2) in each case. The illumination light emanating from the second scattering element SE2 212 forms a first illuminated field LF1 214.

A second light source 221 is embodied as a white light source or RGB light source. To this end, the second light source 221 includes a first red individual light source 224, a second green individual light source 225 and a third blue individual light source 226, each with an associated collector optical device for collimation purposes. The illumination light of the three individual light sources is coupled by a trichroic beam splitter 227 such that white light is available along the second optical axis 222 at the output of said beam splitter. A honeycomb condenser 228 is arranged at the output of the trichroic beam splitter 227. The output of the honeycomb condenser 228 forms a second illuminated field LF2 223.

By way of an optical input coupling element OEE 220, the light of the first illuminated field LF1 214 emanating from the second scattering element SE2 212 is input coupled, in a deflection direction along a kinked beam path, into the beam path of the second light source 221 with a second optical axis 222. A first additional lens 254 is arranged between the second scattering element 212 and the optical input coupling element OEE 220.

The light of the honeycomb condenser emanating from the second illuminated field LF2 223 is guided along a straight beam path through the optical input coupling element OEE 220 in a pass direction. A second additional lens 255 is arranged between the honeycomb condenser 228 and the input coupling element OEE 220.

The optical input coupling element OEE 220 is formed by a wavelength-selective splitter plate. The splitter plate facilitates the passage of white light in the transmission direction and a deflection of fluorescence excitation light in the reflection direction.

FIG. 2 still has a peculiarity of the imaging optical device 230. In the embodiment in accordance with FIG. 1, the imaging optical device 130 is completely arranged downstream of the input coupling element 120. In FIG. 2, the imaging optical device 230 includes a first lens 233, a second lens 234 and a third lens 235 and, additionally, the first additional lens 254 or the second additional lens 255 in each case. The imaging optical device 230 forms a lens system which, in contrast to the embodiment in accordance with FIG. 1, does not completely come to lie downstream of the input coupling element OEE 220. The input coupling element OEE 220 is located within the imaging optical device 230.

For the kinked beam path with the first illuminated field LF1 214 of the laser light source 201, the first additional lens 254, the first lens 233, the second lens 234 and the third lens 235 form an imaging optical device 230 that is telecentric on both sides and has the imaging scale of beta. For the straight beam path with the second illuminated field LF2 223 of the second light source 221, the second additional lens 255, the first lens 233, the second lens 234 and the third lens 235 form an imaging optical device 230 that is telecentric on both sides and has the imaging scale of beta. An imaging optical device that is telecentric on both sides is described in FIG. 3C.

In FIG. 2, the optical input coupling element OEE 220 is arranged between two lenses of the imaging optical device 230. For the kinked beam path, the optical input coupling element OEE 220 is arranged between the first additional lens 254 and the first lens 233. In the straight beam path, the optical input coupling element OEE 220 lies between the second additional lens 255 and the first lens 233. Here, the associated distances in air between the first additional lens 254 and the optical input coupling element OEE 220 and between the second additional lens 255 and the optical input coupling element OEE 220 are the same in each case. The first additional lens 254 and the second additional lens 255 are identical. The first additional lens 254 brings about an adaptation of the first illuminated field LF1 214 to the subsequent optical device. The second additional lens 255 brings about an adaptation of the second illuminated field LF2 223 to the subsequent optical device.

Downstream of the input coupling element OEE 220, the illumination light of the first illuminated field LF1 214 of the laser light source 201 and of the second illuminated field LF2 223 of the second light source 221 are guided in unified fashion to the light source output plane 231. The coupled illumination light is guided through the first lens 233, the second lens 234 and the third lens 235 of the imaging optical device 230 to the light source output plane 231 and there it is coupled into a light guide, not illustrated. The light guide guides the coupled illumination light to an illumination beam path of a surgical microscope such that an object plane is illuminated. Here, the illuminated field in the object plane produced by the illumination light of the light source device with the laser light source 201 is independently adjustable from the illuminated field in the object plane produced by the second light source 221. The same applies to the etendue. The concentration and the intensity of the illumination light of the laser light is adjustable in the object plane independently of that of the second light source 221. Advantageously, the brightness of the laser light illumination can be pulsed in the object plane, independently of the white light illumination.

Further illumination light sources, not illustrated, are able to be coupled into the illumination beam path by further input coupling elements, not illustrated. The concentration and the intensity of the illumination light of the light source device with the laser light source 201 is adjustable or controllable in the object plane, independently of other illumination light sources that are able to be coupled into the beam path.

In an alternative exemplary embodiment, the laser light source is formed by two or three lasers that are coupled by one or more dichroic splitters or by a trichroic beam splitter such that the laser light emitted thereby is coupled along the first optical axis 202. As a result, a plurality of wavelength ranges are available for exciting fluorescence.

In an alternative exemplary embodiment, the laser light source is formed by at least two lasers that are coupled by a fiber coupler. The coupled laser light is guided along the first optical axis 202 and focused on the first scattering element SE1 206.

A plurality of laser light sources can be combined with a white light source in one embodiment. An input coupling element may also include a trichroic beam splitter in one embodiment. To this end, a white light source can be arranged at a first input of the trichroic beam splitter, for example in the pass direction along an optical axis.

A laser light source can be arranged at a second input of the trichroic beam splitter, for example in a reflection direction. A further laser light source can be arranged at a third input of the trichroic beam splitter, for example in a reflection direction.

FIGS. 3A, 3B, 3C and 3D show exemplary embodiments of an illumination device for a surgical microscope with a laser light source, which are adjustable in terms of numerical aperture and dimension of the beam cross section in a light exit plane. The illustration is greatly simplified and shows the arrangement of the main elements and combination options. FIGS. 3A, 3B, 3C, and 3D show some of the components that have already been shown in FIG. 1, with the reference numerals being increased by 200.

Figure 3A:
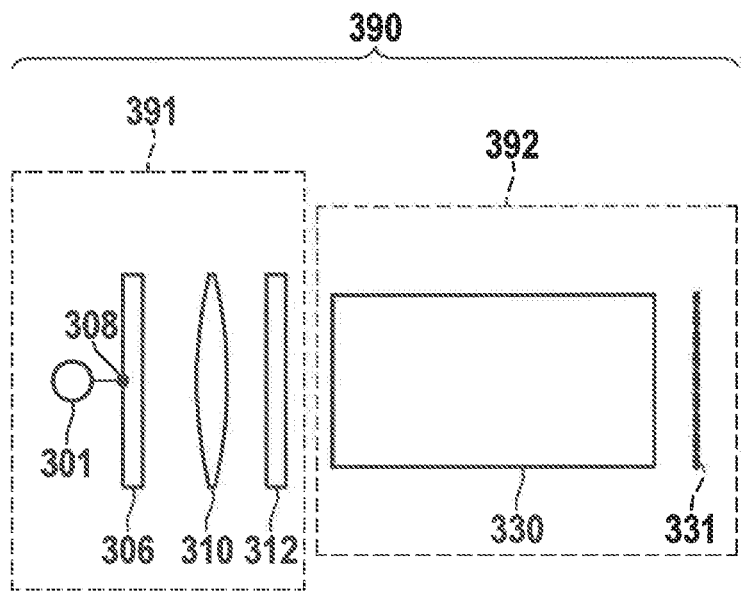
FIG. 3A shows a schematic illustration of the main elements of an illumination apparatus for a surgical microscope with a laser light source.

FIG. 3A shows a schematic illustration of the main elements of an illumination device for a surgical microscope with a laser light source. A first light source device 390 includes a first assembly 391 and a second assembly 392.

The first assembly 391 includes a laser light source 301, a first scattering element SE1 306, a collector optical device OS1 310 and a second scattering element SE2 312. The laser light source produces a laser spot, i.e., a focused first beam cross section 308 with a first dimension L1, on the first scattering element. If the beam cross section 308 is round, the first dimension L1 can be specified by the diameter of the focused light spot. The collector optical device OS1 310 collimates the scattered illumination light emitted by the first scattering element SE1 306 and guides it to the second scattering element SE2 312. On the second scattering element SE2 312, the collimated illumination light has a second beam cross section with the second dimension L2. If the second beam cross section is round, the second dimension L2 can be specified as a diameter.

The choice of the scattering effect of the first scattering element SE1 306 and the focal length of the collector optical device OS1 310 influences the collimated beam cross section with the second dimension L2, or the diameter, of the illumination light emitted by the second scattering element SE2 312. The choice of the scattering effect of the second scattering element SE2 312 influences the numerical aperture of the light emitted by the second scattering element SE2 312.

In one embodiment, the first scattering element SE1 306 can be moved laterally or oscillated in order to reduce speckle. In an exemplary embodiment, the first scattering element SE1 306 can be arranged on a first interchanger that includes at least two first scattering elements SE1 that each have a different scattering effect. The second scattering element SE2 312 can be arranged on a second interchanger on which at least two second scattering elements SE2 312 with different scattering effects are arranged. A change of the first scattering element SE1 306 and/or of the second scattering element SE2 312 facilitates an illumination pupil with an adjustable cross section, or diameter, and an adjustable numerical aperture in the further course of the beam downstream of the second scattering element SE2 312.

The collector optical device OS1 310 may include an individual lens or have a multi-lens embodiment.

The second assembly 392 is arranged in the further beam path downstream of the second scattering element SE2 312. The second assembly includes an imaging optical device 330 and a light source output plane 331. An onward-guiding illumination optical device of a surgical microscope can be arranged in the light source output plane 331. A light guide or an optical fiber bundle is arranged in the light source output plane 331 in one embodiment.

The imaging optical device 330 may have at least three embodiments. The imaging optical device 330 is embodied as an imaging optical device that is telecentric on both sides and has an imaging scale beta in a first embodiment. The imaging optical device that is telecentric on both sides is described in FIG. 3C.

The imaging optical device 330 is embodied as a collimating imaging optical device with a second focal length f2 in a second exemplary embodiment. The collimating imaging optical device is described in FIG. 3D. The first assembly 391 is combined with an imaging optical device 330 in both embodiments. Advantageously, the illumination pupil at the output of the first assembly 391, i.e., the illumination light emanating from the second scattering element SE2 312 and forming a first illuminated field 314, is imaged or projected in defined fashion onto the light source output plane 331 by the imaging optical device 330.

An imaging optical device 330 is dispensed with in a third embodiment such that the light source output plane 331 is arranged directly downstream of the second scattering element SE2 312. The third exemplary embodiment can be formed if there are particular requirements in respect of the compactness of a light source device.

Advantageously, an optical input coupling element can be arranged between the first assembly 391 and the second assembly 392 in a further exemplary embodiment in order to couple the illumination light of a further light source into the illumination beam path. An optical input coupling element may also be arranged between the lenses of the second assembly 392 in an alternative exemplary embodiment in order to couple the illumination light of a further light source into the illumination beam path. An exemplary embodiment to this end is illustrated in FIG. 2.

Figure 3B:
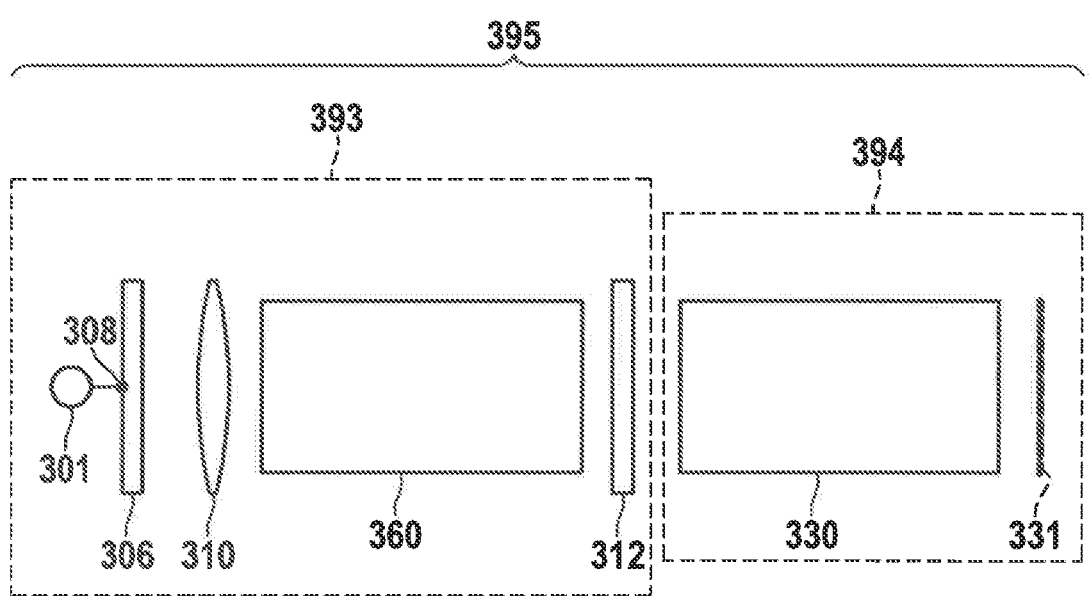
FIG. 3B shows a schematic illustration of the main elements of an illumination apparatus for a surgical microscope with a laser light source with an afocal zoom system.

FIG. 3B shows a schematic illustration of the main elements of an illumination device for a surgical microscope with a laser light source with an afocal zoom system.

A second light source device 395 includes a third assembly 393 and a fourth assembly 394. The third assembly 393 includes the same components as the first assembly 391 in accordance with FIG. 3A. The third assembly 393 differs from the first assembly 391 in that an afocal zoom system 360 is arranged between the collector optical device OS1 310 and the second scattering element SE2 312.

The beam cross section with the second dimension L2, or the diameter in the case of a round beam cross section, can be set to the second scattering element SE2 312 by the afocal zoom system 360 and by setting the pupil enlargement factor gamma. The value NAmin(SE2) of the minimally achievable value of the numerical aperture NA(SE2) at the location of the second scattering element SE2 312 for the case without an afocal zoom system changes by an afocal zoom system 360 to a value of NAmin(SE2)/gamma on the second scattering element SE2 312.

Figure 3C:
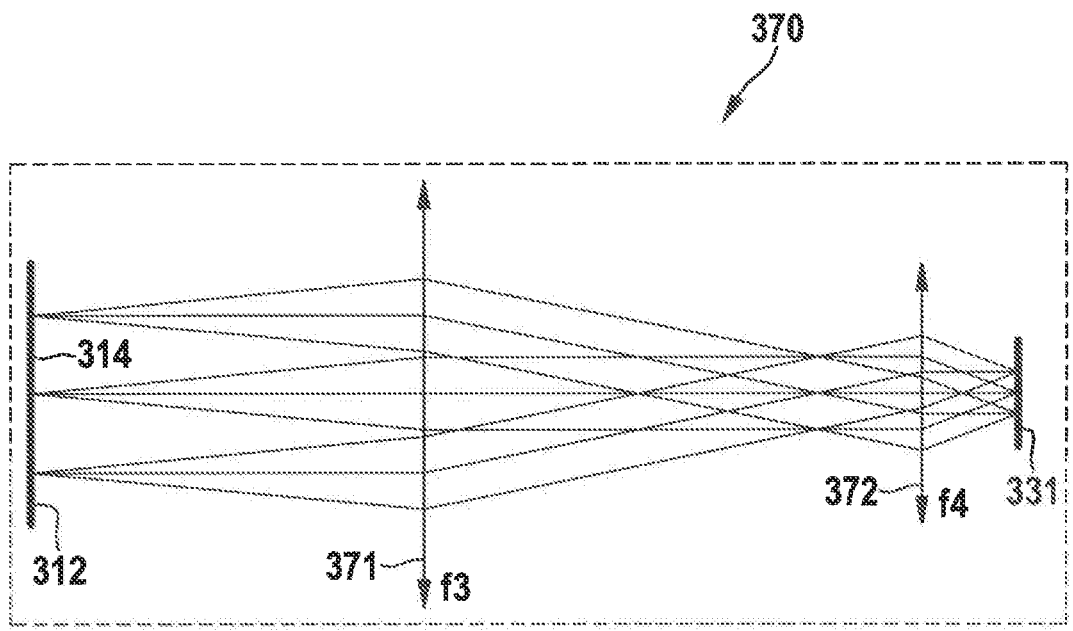
FIG. 3C shows a schematic illustration of an embodiment variant of an imaging optical device as an imaging optical device that is telecentric on both sides and has an imaging scale beta.
Figure 3D:
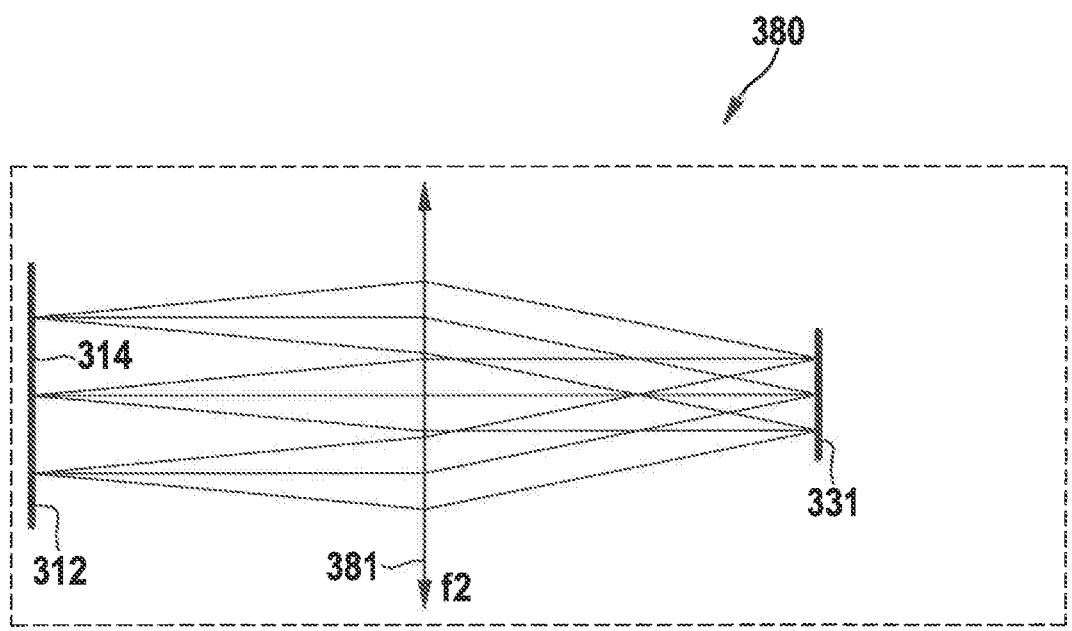
FIG. 3D shows a schematic illustration of an imaging optical device as a collimating imaging optical device according to an exemplary embodiment of the disclosure.

The fourth assembly 394 includes the same components and features as already described in FIG. 3A. Consequently, the fourth assembly may likewise include an imaging optical device 330, which is embodied as an imaging optical device that is telecentric on both sides, as illustrated in FIG. 3C, or as a collimating imaging optical device, as illustrated in FIG. 3D. The imaging optical device 330 may also be dispensed with in an alternative embodiment.

FIG. 3C shows a schematic illustration of an embodiment variant of an imaging optical device 330 as an imaging optical device that is telecentric on both sides and has an imaging scale beta.

FIG. 3C shows the beam profile through the imaging optical device 330 between the second scattering element SE2 312 and the light source output plane 331 for three exemplary partial beams.

The imaging optical device 330 is embodied as an imaging optical device 370 that is telecentric on both sides. The imaging optical device 370 that is telecentric on both sides includes a first lens element 371 and a second lens element 372, which are each represented by a double-headed arrow. A double-headed arrow in each case defines a principal plane of the first lens element 371 and of the second lens element 372. The first lens element 371 and the second lens element 372 may each include a single lens, double lenses or multi-member lens systems. The first lens element 371 has a first positive refractive power and a third focal length f3. The second lens element 372 has a positive refractive power and a fourth focal length f4.

The illumination light emanating from the second scattering element SE2 312 forms a first illuminated field 314. As a result of the scattering effect, the second scattering element SE2 312 increases the numerical aperture of the light in the case of an unchanging beam cross section. The illumination light is emitted by the second scattering element SE2 312 with the second numerical aperture.

The imaging optical device 370 that is telecentric on both sides images the first illuminated field 314 into the light source output plane 331 with the imaging scale beta. The imaging scale beta of the imaging optical device 370 that is telecentric on both sides is defined as beta=−f4/f3. The imaging scale beta is finite. Therefore, the imaging optical device is also referred to as a "finite optical device". The numerical aperture is scaled by a factor of |1/beta| (absolute value of 1 divided by beta). The illumination light has a third numerical aperture in the light source output plane 331.

A change in the beam cross section with the second dimension L2, or in the diameter, brings about a change in the size of the first illuminated field 314. Consequently, a change in the size of the first illuminated field 314 brings about a change in the beam cross section with the third dimension L3, or in the diameter, in the light source output plane 331 with a factor of |beta| (absolute value of beta). However, the third numerical aperture in the light source output plane 331 remains constant when there is a change in the beam cross section in the light source output plane 331.

FIG. 3D shows a schematic illustration of an exemplary embodiment variant of an imaging optical device 330 as a collimating imaging optical device.

FIG. 3D shows the beam profile for the imaging optical device 330 between the second scattering element SE2 312 and the light source output plane 331 for three exemplary partial beams.

The imaging optical device 330 is embodied as a collimating imaging optical device 380. The collimating imaging optical device 380 includes a second collector optical device 381 with a second focal length f2. The second collector optical device is represented as a double-headed arrow. The double-headed arrow defines a principal plane of the second collector optical device. The first focus of the second collector optical device 381 lies on the second scattering element SE2 312 in the plane of the first illuminated field 314. The second focus of the collector optical device lies in the light source output plane 331. The second collector optical device 381 may include an individual lens, a double lens or a multi-member lens system. The second collector optical device 381 has positive refractive power.

The second collector optical device 381 collimates the first illuminated field 314 and images the far field thereof (angle distribution) into the light source output plane 331 as a transformed illuminated field. The third dimension L3 of the beam cross section, or of the diameter in the case of a round beam cross section, of the transformed illuminated field can be set by way of the second numerical aperture NA(SE2) of the first illuminated field 314 and has a value of: L3=2×f2×NA(SE2). The numerical aperture of the transformed illuminated field can be set by way of the second dimension L2 on the second scattering element SE2, or of the first illuminated field 314, and has a value of: NA(L2) =sin (atan(L2/2/f2)). The second collimator optical device 381 forms an option for transporting the light of the first illuminated field to the location of the light source output plane 331 with an unchanged etendue such that it can be efficiently received there by a subsequent optical device or a light guiding element with an etendue that is greater than or equal to that of the first illuminated field.

A change in the beam cross section on the second scattering element SE2 312 with the second dimension L2, or in the diameter, brings about a change in the size of the first illuminated field 314. In this embodiment, a change in the size of the first illuminated field 314 has only a very small influence on the beam cross section with the third dimension L3, or of the diameter, in the light source output plane 331. However, a change in the beam cross section on the second scattering element SE2 312, or in the size of the first illuminated field 314, has a large influence on the value of the third numerical aperture in the light source output plane 331.

Consequently, FIGS. 3A, 3B, 3C and 3D define six different exemplary embodiments of a light source device. The first three exemplary embodiments form the first assembly 391, without an afocal zoom system, in combination with the second assembly 392, which includes an imaging optical device that is telecentric on both sides, a collimating imaging optical device or no imaging optical device. Three further exemplary embodiments form the third assembly 393, with an afocal zoom system, in combination with the fourth assembly 394, which includes an imaging optical device that is telecentric on both sides, a collimating imaging optical device or no imaging optical device.

The etendue, as a product of the third dimension L3 and the third numerical aperture in the light source output plane 331, can be manipulated in a targeted fashion and with little luminous flux variation in the case of optical systems that have been appropriately designed without vignetting in all six exemplary embodiments, which are shown in FIGS. 3A, 3B, 3C, and 3D.

FIG. 4A and FIG. 4B show a schematic illustration of a third exemplary embodiment of an illumination device for a surgical microscope with a laser light source.

FIG. 4A and FIG. 4B show the same components as the illumination apparatus in accordance with FIG. 1, with the reference signs being increased by 300. Additionally, FIGS. 4A and 4B show an afocal zoom system 460, which is arranged between a collector optical device OS1 410 and a second scattering element SE2 412. An imaging optical device 430 is formed by an imaging optical device 470 that is telecentric on both sides with an imaging scale beta. FIG. 4A shows the afocal zoom system 360 in a first zoom setting. FIG. 4B shows the afocal zoom system 460 in a second zoom setting.

FIG. 4A and FIG. 4B show the effect of the afocal zoom system 470 on the beam cross section and the numerical aperture in a light source output plane 431 if the imaging optical device 430 is embodied as an imaging optical device 470 that is telecentric on both sides.

A collimated laser light source 401 is arranged along a first optical axis 402. The collimated laser light 403 emitted by the laser light source 401 is focused by way of a focusing optical device 404 onto a first scattering element SE1 406, which is formed by a first diffusion screen.

The center of the focused laser light lies in the first plane 407 on the first scattering element SE1 406, which coincides with the front first focus P1 of the collector optical device OS1 410. The scattered light is emitted into a solid angle by the scattering effect of the first scattering element SE1 406 and a fanned first scattered beam 409 with a first numerical aperture NA(SE1) is formed, which is imaged by the collector optical device OS1 410 and the afocal zoom system 460 arranged in the subsequent beam profile onto a second scattering element SE2 412. The collector optical device OS1 410 may include an individual lens, a double lens or a multi-member lens system.

The afocal zoom system 460 includes a first lens group 461, a second lens group 462, a third lens group 463 and a fourth lens group 464. The first lens group 461 and the fourth lens group 464 are arranged securely. The second lens group 462 and the third lens group 463 are displaceable along the first optical axis 402. The afocal zoom system 460 consequently forms a variable optical device that is arranged along the first optical axis 402 between the collector optical device OS1 410 and the second scattering element SE2 412. The combination of collector optical device OS1 410 with a fixed focal length and the afocal zoom system 460 forms a multi-lens collector optical device with a variable focal length with a fixed position of the front focal plane on the first plane 407. The beam emerging from the collector optical device OS1 410 in collimated fashion is still guided in a collimated beam path 411 downstream of the fourth lens group 464 of the afocal zoom system 460. The resultant beam in a second plane 413, at the location of the second scattering element SE2 412, therefore remains collimated.

The imaging optical device 430 is arranged downstream of the second scattering element SE2 412. The imaging optical device 430 is embodied as an imaging optical device 470 that is telecentric on both sides. An imaging optical device that is telecentric on both sides is shown in FIG. 3C. The imaging optical device 470 that is telecentric on both sides includes at least a first lens element 471 and a second lens element 472, which are each represented by a double-headed arrow. A double-headed arrow in each case defines a principal plane of the first lens element 471 and of the second lens element 472. The first lens element 471 and the second lens element 472 may each include a single lens, double lenses or multi-member lens systems. The first lens element 471 has a first positive refractive power and a third focal length f3. The second lens element 472 has a positive refractive power and a fourth focal length f4.

The illumination light emanating from the second scattering element SE2 412 forms a first illuminated field 414 in the second plane 413. As a result of the scattering effect, the second scattering element SE2 412 increases the numerical aperture of the light in the case of an unchanging beam cross section. The illumination light is emitted by the second scattering element SE2 412 with the second numerical aperture.

The imaging optical device 470 that is telecentric on both sides images the first illuminated field 414 into the light source output plane 431 with the imaging scale beta. The imaging scale beta of the imaging optical device 470 that is telecentric on both sides is defined as beta=−f4/f3. The imaging scale is finite. The numerical aperture is scaled by a factor of |1/beta| (absolute value of 1 divided by beta). The illumination light has a third numerical aperture in the light source output plane 431.

On the second scattering element SE2 412, in the second plane, the collimated illumination light has a second beam cross section with the second dimension L2. The second beam cross section is round in this exemplary embodiment such that the second dimension L2 can be specified as a diameter.

The illumination light has a third beam cross section with a third dimension L3 in the light source output plane 431. The third beam diameter is round; as a result, the third dimension L3 has the value of the diameter of the third beam cross section.

FIG. 4A and FIG. 4B show the effect of the afocal zoom system 460 in combination with the overall system and the imaging optical device 430 embodied as an imaging optical device 470 that is telecentric on both sides. The figures show how a beam cross section and the numerical aperture are adjustable at the light source output in the light source output plane 431.

FIG. 4A shows a first setting of the afocal zoom system 470. The second lens group 462 and the third lens group 463 are arranged with little spacing in the center between the first lens group 461 and the fourth lens group 464, resulting in a large magnification scale of L2/L1. A second beam cross section with second dimension L2 in the second plane 413 is large. The third beam cross section in the light source output plane 431 has the third dimension L3, which is defined by the imaging scale beta of the imaging optical device 430.

FIG. 4B shows a second setting of the afocal zoom system 470. The second lens group 462 and the third lens group 463 have a relatively large spacing and the third lens group 463 is positioned tightly next to the fourth lens group 464, resulting in a small magnification scale of L2/L1. A second beam cross section with a second dimension L2 in the plane 413 is small. The third dimension L3 of the third beam cross section in the light source output plane 431 is likewise reduced and defined by the imaging scale beta of the imaging optical device 430.

In this case, the second numerical aperture of the illumination light emitted by the second scattering element SE2 and the third numerical aperture in the light source output plane 431 are the same in both zoom settings in accordance with FIGS. 4A and 4B. Even though the third dimension L3 of the beam cross section in FIG. 4B is smaller than in FIG. 4A, the second numerical aperture and the third numerical aperture respectively have the same value in both cases.

In an exemplary embodiment, the second scattering element SE2 412 can be arranged on an interchanger and can be replaced by another second scattering element SE2 412 with a different second numerical aperture. If the second numerical aperture changes, so does the value of the third numerical aperture. If the zoom setting remains unchanged in the process, this allows the value of the third numerical aperture to be set without the beam cross section with the third dimension L3 in the light source output plane 431 being changed in the process.

If the subsequent illumination optical device of a surgical microscope is embodied as a Köhler illumination, the size of the illuminated field in the object plane can advantageously be set by merely changing the second numerical aperture. In the case of the Köhler illumination, a setting of the afocal zoom system 470 only has a small effect on the illuminated field size in the object plane; however, it can be used to avoid vignetting in the illumination system.

The small residual effect therefore originates from the collimated light from the collector optical device OS1 410 with the fixed focal length fOS1 having a finite numerical aperture NAmin=sin(atan(L1/2/$f_{OS1}$)) on account of the finite laser spot size. Now, this aperture NAmin is modified by the subsequent afocal zoom system 470. If the pupil magnification of the afocal zoom system 470 equals gamma, then the numerical aperture upstream of the second scattering element SE2 412 is defined by the following equation: NAmin(SE2)=sin(atan(L1/2/fOS1))/gamma=NAmin/gamma.

If the subsequent illumination optical device of a surgical microscope is embodied as a spot illumination beam path, then the second numerical aperture and the beam cross section with the third dimension L3 in the light source output plane 431 must be modified in order to significantly change the illuminated field size in the object plane. A reduction of the third dimension L3 and a reduction of the second numerical aperture bring about an increase in the light concentration in the object plane.

The beam path in FIG. 4A and in FIG. 4B is illustrated in each case as a beam path along the first optical axis 402. An optical input coupling element OEE can be arranged between the second scattering element SE2 412 and the imaging optical device 430 in an exemplary embodiment in order to couple the illumination light of the laser light source 401 into the beam path of a second light source, not illustrated here, but as shown in FIG. 1.

An optical input coupling element OEE is arranged downstream of the second scattering element SE2 412 between the optical elements of the imaging optical device 430 in an alternative exemplary embodiment in order to couple the illumination light of the laser light source 401 into the beam path of a second light source, not illustrated here. An example to this end is shown in FIG. 2.

FIG. 5A and FIG. 5B show a schematic illustration of a fourth exemplary embodiment of an illumination device for a surgical microscope with a laser light source with an afocal zoom system.

FIG. 5A and FIG. 5B show the same components as the illumination apparatus in accordance with FIG. 4A and FIG. 4B, with the reference signs being increased by 100. FIG. 5A and FIG. 5B differ from the exemplary embodiment in accordance with FIG. 4A and FIG. 4B in that an imaging optical device 530 is formed by a collimating imaging optical device 580.

FIG. 5A shows the afocal zoom system 560 in a first zoom setting. FIG. 5B shows the afocal zoom system 560 in a second zoom setting. FIG. 5A and FIG. 5B show the effect of an afocal zoom system 560 on the beam cross section and the numerical aperture in a light source output plane 531 if the imaging optical device 530 is embodied as a collimating imaging optical device 580. The collimating imaging optical device 580 has a different effect than the optical device that is telecentric on both sides in accordance with FIGS. 4A and 4B.

The collimating imaging optical device 580 includes a second collector optical device 581 with a second focal length f2 and positive refractive power. The second collector optical device 581 is represented by double-headed arrow that defines a principal plane of the second collector optical device 581. The second collector optical device 581 may include an individual lens, a double lens or a multi-member lens system.

The collimating imaging optical device 580 is shown in FIG. 3D. The second collector optical device 581 collimates the first illuminated field 514 and consequently images the far field thereof into the light source output plane 531 as a transformed illuminated field.

A change in the beam cross section on the second scattering element SE2 512 with the second dimension L2, or in the diameter, brings about a change in the size of the first illuminated field 514. A change in the beam cross section on the second scattering element SE2 512, or in the size of the first illuminated field 514, has a large influence on the value of the third numerical aperture in the light source output plane 531. By contrast, a change in the size of the first illuminated field 514 has only a very small influence on the beam cross section with the third dimension L3, or of the diameter, in the light source output plane 531. The etendue in the object plane can be modified in defined fashion by setting the second numerical aperture and the beam cross section with the second dimension L2 on the second scattering element SE2 512.

If the subsequent illumination optical device of a surgical microscope is embodied as a Köhler illumination, a change in the third numerical aperture in the light source output plane 531 already influences the illuminated field size in the object plane of the surgical microscope.

If the subsequent illumination optical device of a surgical microscope is embodied as a spot illumination beam path, then the illuminated field size in the object plane of the surgical microscope is modified both by changing the third numerical aperture and by the beam cross section with the second dimension L2 on the second scattering element SE2 512, or the size of the first illuminated field 514. The value of the third numerical aperture and the size of the first illuminated field 514 should be reduced to significantly reduce the size of the illuminated field 514 in the object plane.

FIGS. 4A, 4B, 5A, and 5B elucidate the effect of an afocal zoom system with two different variants of an imaging optical device 430, 530, which may be embodied either as an imaging optical device 470 that is telecentric on both sides or as a collimating imaging optical device 580. These figures elucidate the effect that the scattering angle breadth of the second scattering element SE2 412, 512 is dominant over the beam divergence of the collimated illumination beam path upstream of the second scattering element SE2 412, 512.

Figure 6:
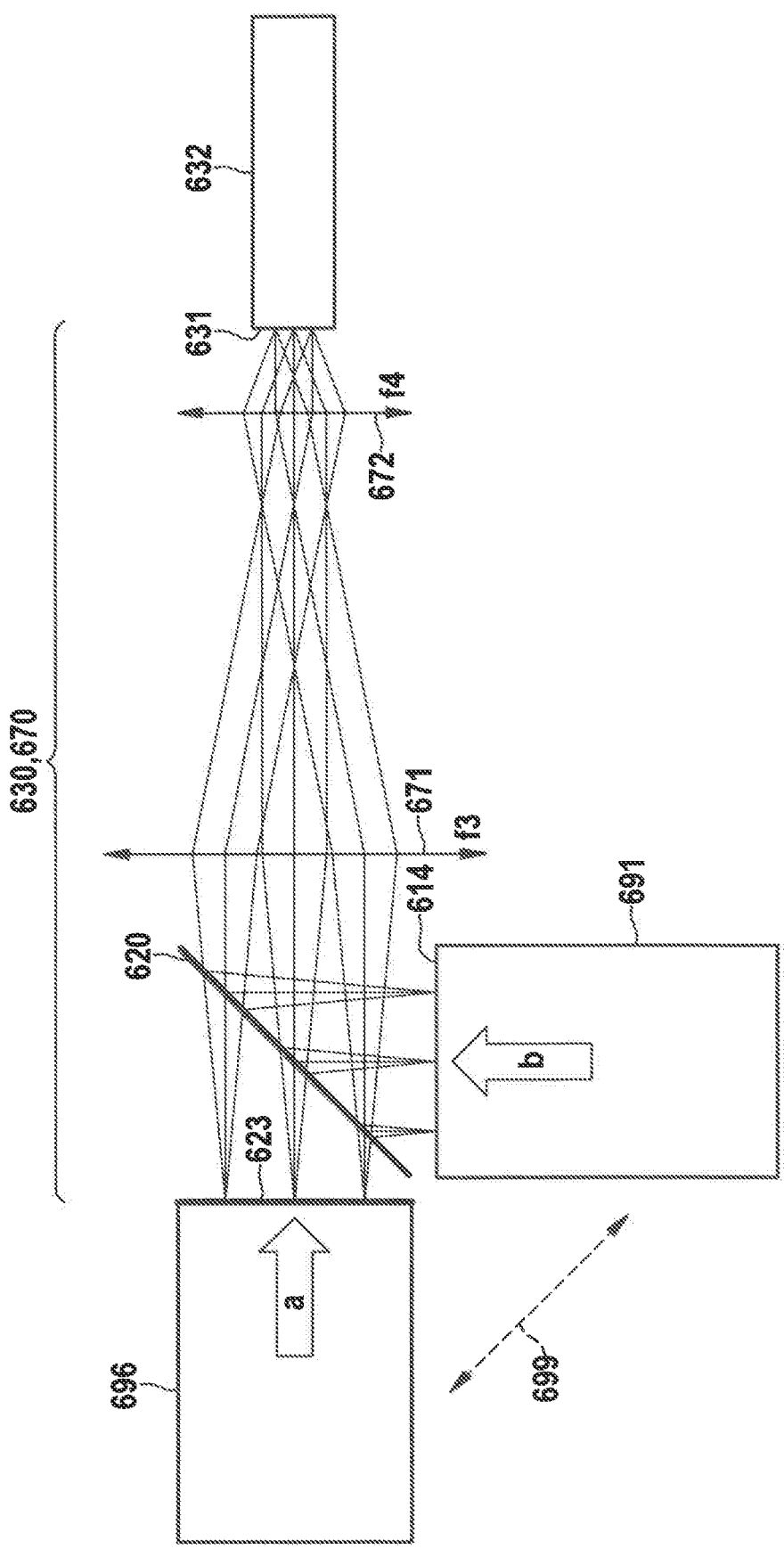
FIG. 6 shows a schematic illustration of an illumination device for a surgical microscope with a laser light source, a white light source and an imaging optical device that is telecentric on both sides according to a fifth exemplary embodiment of the disclosure.

FIG. 6 shows a schematic illustration of a fifth exemplary embodiment of an illumination device for a surgical microscope with a laser light source, a white light source and an imaging optical device that is telecentric on both sides.

FIG. 6 shows a first assembly 691 with a laser light source, as described in FIG. 3A. The laser light source emits laser light that is suitable for exciting fluorescence. The illumination light of the laser light source is schematically represented by an arrow that is labeled "b". The illumination light emitted by a first illuminated field LF1 614 with a second numerical aperture is guided to a light source output plane 631 via an imaging optical device 630 embodied as an imaging optical device 670 that is telecentric on both sides. The imaging optical device 670 that is telecentric on both sides is described in FIGS. 3C, 4A and 4B. A light guide 632 that guides the illumination light to a surgical microscope is arranged in the light source output plane 631.

FIG. 6 differs from the exemplary embodiments shown in FIGS. 3C, 4A, and 4B in that an optical input coupling element OEE 620 is arranged in the beam path between the first illuminated field LF1 614 and a first lens element 671. The illumination light emitted by the first illuminated field LF1 614 is guided over the optical input coupling element OEE 620 in the reflection direction.

A fifth assembly 696 includes a second light source, which is embodied as a white light source or RGB light source. The illumination light of the second light source is schematically represented by an arrow that is labeled "a". The output of the fifth assembly 696 with the second light source forms a second illuminated field LF2 623. The illumination light emitted by the second illuminated field LF2 623 is guided through the optical input coupling element OEE 620 in the transmission direction. By way of example, the optical input coupling element OEE 620 is formed by a wavelength-selective splitter plate. The splitter plate facilitates the passage of white light in the transmission direction and a deflection of fluorescence excitation light in the reflection direction.

The optical input coupling element OEE 620 brings about the coupling of the illumination light of the first assembly 691 with the laser light source and of the illumination light of the fifth assembly 696 with the second light source in a common beam path. The coupled illumination light is guided through the imaging optical device 670 that is telecentric on both sides to the light source output plane 631 and is coupled into the light guide 632. The light guide 632 guides the coupled illumination light along the illumination beam path of the surgical microscope to an object plane. Here, the illuminated field in the object plane that is produced by the illumination light of the first assembly 691 with a laser light source is adjustable independently of the illuminated field that is produced by the fifth assembly 696 with the second light source. The same applies to the etendue.

In an alternative exemplary embodiment, the arrangements of the fifth assembly 696 with the second light source and of the first assembly 691 with the laser light source are interchanged, as indicated by the double-headed arrow 699. The optical input coupling element OEE 620 is embodied in such a way in this exemplary embodiment that the laser light is guided over the optical input coupling element OEE 620 in the transmission direction and the illumination light of the second light source is guided thereover in the reflection direction.

Figure 7:
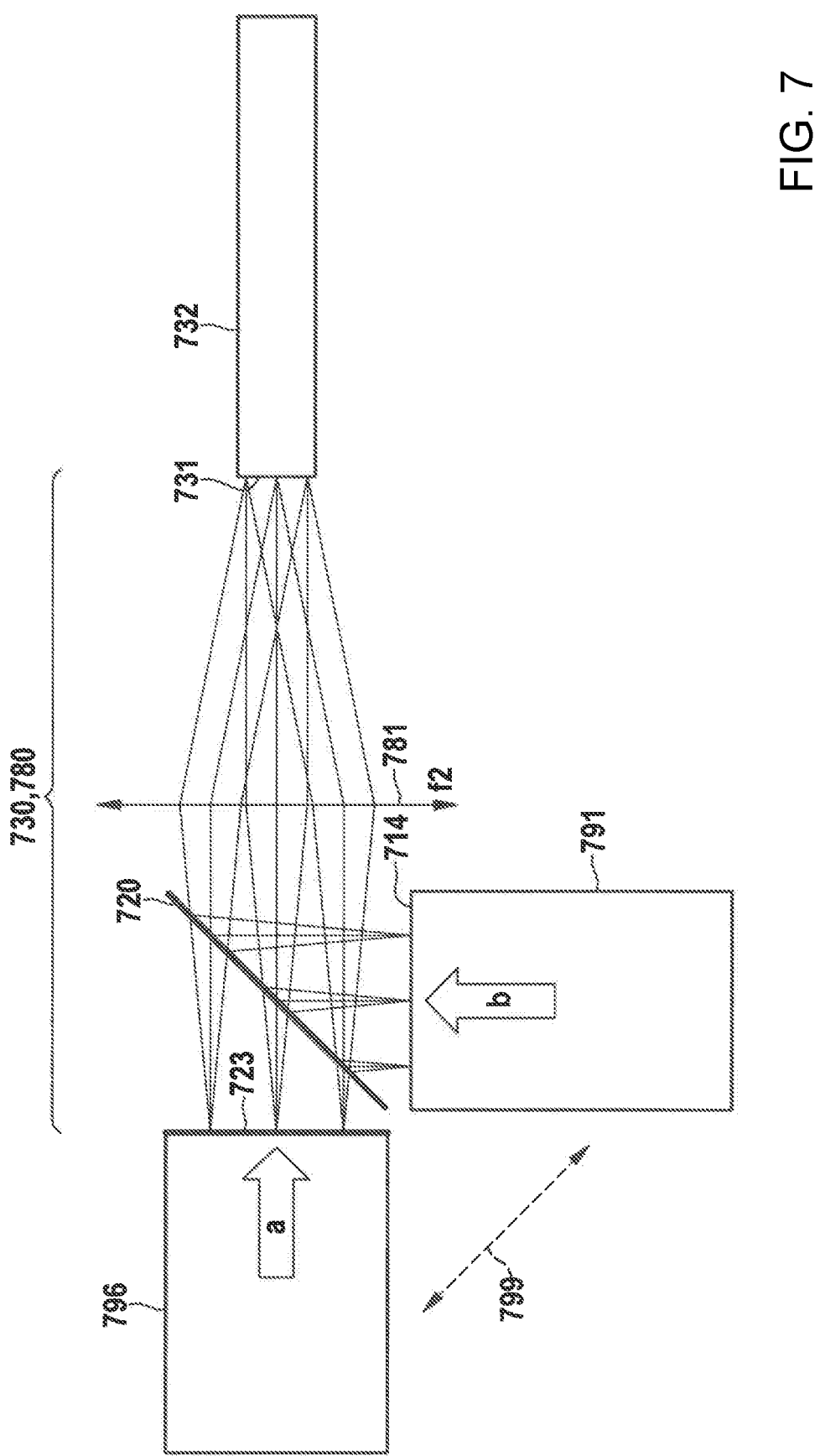
FIG. 7 shows a schematic illustration of an illumination device for a surgical microscope with a laser light source, a white light source and a collimating imaging optical device according to a sixth exemplary embodiment of the disclosure.

FIG. 7 shows a schematic illustration of a sixth exemplary embodiment of an illumination device for a surgical microscope with a laser light source, a white light source and a collimating imaging optical device.

FIG. 7 shows the same components as already illustrated in FIG. 6, with the reference signs being increased by 100. FIG. 7 differs from the embodiment in accordance with FIG. 6 in that an imaging optical device 730 is embodied as a collimating imaging optical device 780, as described in FIG. 3D.

The illumination light emitted by the first assembly 791 with a laser light source and the illumination light emitted by a fifth assembly 796 with a second light source are coupled into a common beam path of a collimating imaging optical device 780 via an optical input coupling element OEE 720. The coupled illumination light is guided to an object plane via a light guide 732 and the illumination beam path of a surgical microscope. Here, the illuminated field in the object plane that is produced by the illumination light of the first assembly 791 with a laser light source is adjustable independently of the illuminated field that is produced by the fifth assembly 796 with the second light source. The same applies to the etendue.

Figure 8A:
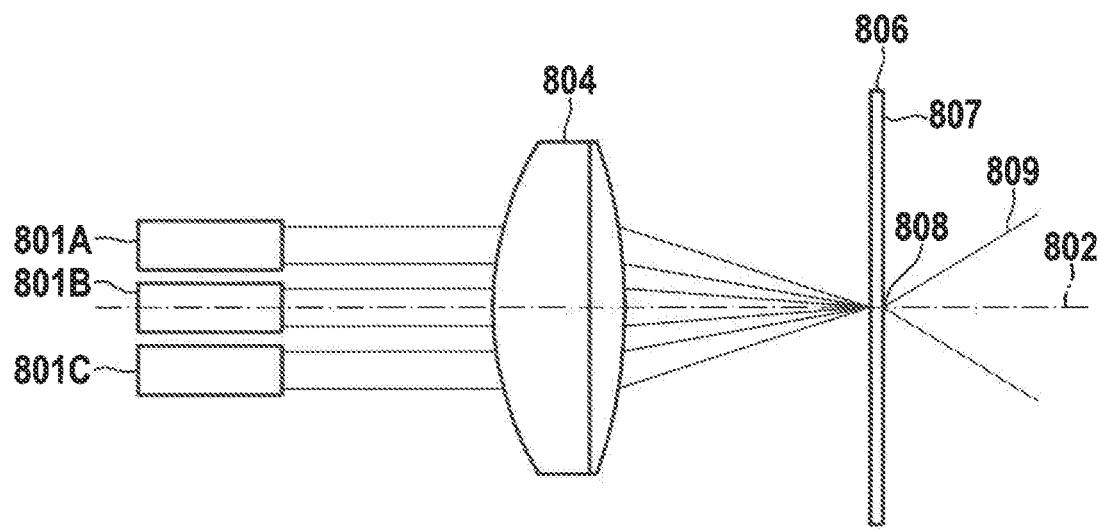
FIG. 8A shows an arrangement of laser light source modules arranged in collimated fashion, the illumination light of said laser light source modules being focused onto the first scattering element SE1 by a focusing element 804.

FIG. 8A shows an arrangement of laser light source modules arranged in collimated fashion, the illumination light of said laser light source modules being focused onto the first scattering element SE1 by a focusing element.

FIG. 8A shows a first laser light source module 801A, a second laser light source module 801B and a third laser light source module 801C, which are arranged in collimated fashion along an optical axis 802. The collimated laser light emitted by the first laser light source module 801A, the second laser light source module 801B and the third laser light source module 801C is focused onto a first scattering element SE1 806 by a focusing element 804. The laser light of the three laser light source modules 801A, 801B, 801C is focused onto a common first plane 807 in a first beam cross section 808 with a first dimension L1. The first beam cross section 808 can be punctiform in diffraction-limited fashion.

The first scattering element 806 forms a resultant primary light source of the overlaid laser light source modules. The resultant primary light source has a high luminance. A first scattered beam 809 is emitted by the first scattering element SE1 806. The first numerical aperture NA(SE1) is definable by the scattering effect of the first scattering element SE1.

The first laser light source module 801A, the second laser light source module 801B and the third laser light source module 801C emit laser light in the same wavelength range in one embodiment. Advantageously, there consequently is an addition of luminous power in a wavelength range. Consequently, the first scattering element SE1 806 forms a primary light source, the luminous power of which corresponds to the sum of the luminous powers of the three individual laser light source modules. A primary light source with an N-fold power arises in the case of a total of N laser light source modules with the same power. A high luminance can be generated in one wavelength range.

The first laser light source module 801A, the second laser light source module 801B and the third laser light source module 801C emit laser light in different wavelength ranges in one embodiment. The various laser light wavelengths are overlaid on the first scattering element SE1 806. Advantageously, the first scattering element SE1 806 forms a multi-spectral primary light source.

In an exemplary embodiment, the laser light source modules 801A, 801B, 801C are formed by laser diode modules with an integrated collimation optical device or focusing optical device.

Only two laser light source modules or else more than three illustrated laser light source modules may also be present in an exemplary embodiment. By way of example, this is shown in FIG. 8C. In the case of non-circular beam cross sections of the laser light source modules 801A, 801B, and 801C, each laser light source module 801A, 801B, and 801C can be rotated in the azimuthal direction in such a way that a light spot that is as point symmetric as possible arises in the common focus from the superposition. By way of example, to this end, pairs of opposing laser light source modules may have the same wavelength in each case.

Figure 8B:
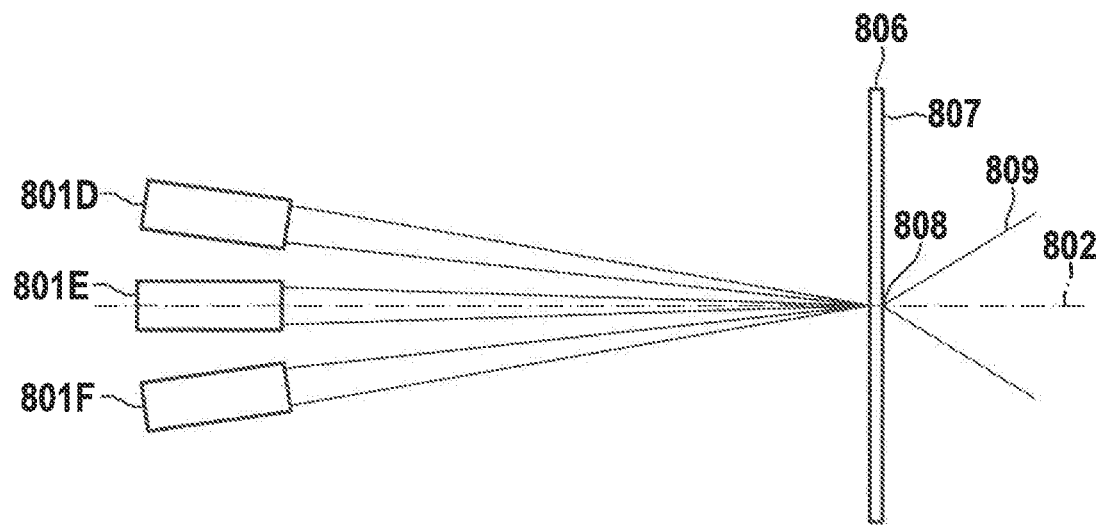
FIG. 8B shows an arrangement of laser light source modules, the illumination light of said laser light source modules being focused directly onto the first scattering element SE1.

FIG. 8B shows an arrangement of laser light source modules, the illumination light of said laser light source modules being focused directly onto the first scattering element SE1.

FIG. 8B shows the same components as the illumination apparatus in accordance with FIG. 8A, albeit without a focusing element. FIG. 8B differs from the embodiment according to FIG. 8A in that a first laser light source module 801D, a second laser light source module 801E and a third laser light source module 801F are not arranged in parallel. The three laser light source modules 801D, 801E, and 801F are arranged in relation to one another at such an angle that the emitted laser light is directly focused onto a first scattering element SE1 806 in a first plane 807 in a first beam cross section 808 with a first dimension L1. The exemplary embodiments described in relation to FIG. 8A are also possible for the exemplary embodiment in accordance with FIG. 8B. The laser light source modules 801D, 801E, and 801F can emit laser light in a single wavelength range or in different wavelength ranges.

FIG. 8C shows four exemplary embodiments of an arrangement of laser light source modules perpendicular to an optical axis.

A first arrangement 816 shows a round arrangement with seven laser light source modules. A first laser light source module is arranged on the optical axis 802, six further laser light source modules are positioned around it in circular fashion. The first arrangement is compact and provides a high luminous power.

A second arrangement 817 shows a cruciform arrangement with five laser light source modules, with a fifth laser light source module being arranged on the optical axis 802. A third arrangement 818 shows a ring-shaped or circular arrangement with six laser light source modules. A fourth arrangement 819 shows a square arrangement of four laser light source modules. The fourth arrangement 819 includes the four outer laser light source modules of the second arrangement 817 without the centrally arranged fifth laser light source module.

Figure 9A:
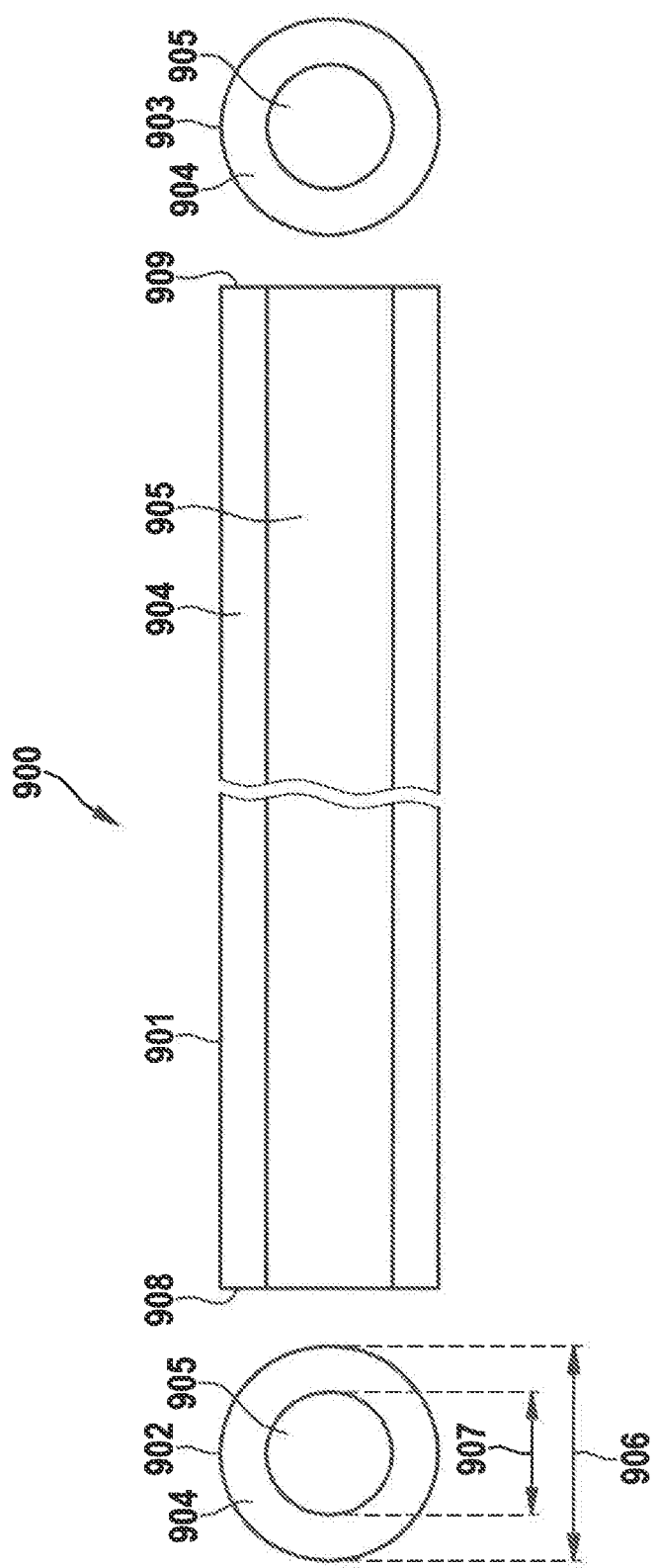
FIG. 9A shows a first exemplary embodiment for an optical fiber bundle, embodied as a two-region fiber bundle.

FIG. 9A shows a first exemplary embodiment for an optical fiber bundle, embodied as a two-region fiber bundle.

FIG. 9A shows, in a sectional illustration 901, an optical fiber bundle 900 in a side view and, respectively in a plan view, a first fiber end 902 and a second fiber end 903. The first fiber end 902 forms a light input side 908; the second fiber end 903 forms a light output side 909. The light input side 908 and the light output side 909 are respectively interchangeable.

The optical fiber bundle 900 includes an outer fiber region 904 and an inner fiber region 905. The optical fiber bundle 900 includes two fiber regions 904, 905 and is therefore referred to as two-region fiber bundle. The optical fiber bundle has a round cross section and the two fiber regions 904, 905 are arranged concentrically. The optical fiber bundle 900 has an outer diameter 906 and an inner diameter 907, which forms the boundary between the outer fiber region 904 and an inner fiber region 905. Consequently, the two fiber regions 904, 905 form fiber regions 904, 905 that are delimited from one another.

The outer fiber region 904 includes incoherent optical fibers and the inner fiber region 905 includes incoherent optical fibers. Consequently, each fiber region includes many individual fibers which, although they are separated in regions, are not arranged in sorted fashion within a region. All optical fibers in a fiber region have the same configuration. Consequently, the optical fibers are the same in terms of form, cross section and the optical properties, for example for the value of the numerical aperture. All optical fibers of the optical fiber bundle 900 are the same in one embodiment.

What the unsorted arrangement brings about is that a light pattern that is coupled into the optical fiber bundle 900 in the outer fiber region 904 and in the inner fiber region 905 at the first fiber end 902, the light input side 908, is no longer available in this form at the second fiber end 903, the light output side 909, and is subjected to a lateral change. Unequal illuminations of the outer fiber region 904 and of the inner fiber region 905 at the light input side 908 in each case emerge in more homogeneous fashion from the two fiber regions 904 and 905 at the light output side 909 in the case of good spatial mixing of the incoherent optical fibers within the two fiber regions 904 and 905.

By way of example, the optical fiber bundle 900 has a round embodiment and a light pattern is formed by virtue of half of the diameter being illuminated at the light input side 908. Then, at the light input side 908, the illuminated fiber ends of the two fiber regions 904, 905 are all located in one diameter half of the first fiber end 902 and the non-illuminated fiber ends of the two fiber regions 904, 905 are all located in the other diameter half of the first fiber end 902. However, at the light output side 909, the light guiding and the non-light guiding fiber ends in the outer fiber region 904 and in the inner fiber region 905 no longer lie in separate diameter halves at the second fiber end 903; instead, they are distributed more or less homogenously over the two fiber regions 904, 905, depending on the mixing, albeit still lying separately in the two fiber regions 904 and 905.

FIG. 9B shows the use of a two-region fiber bundle according to FIG. 9A.

FIG. 9B shows three examples of how a multi-region fiber bundle, configured as a two-region fiber bundle in this exemplary embodiment, can be used to couple the illuminated field at the output of the illumination light source, the light source output plane, into an optical fiber bundle 900 and transport said illuminated field to an onward-guiding illumination optical device.

In a first case 910, a first illumination light 911 with a first numerical aperture is coupled into the optical fiber bundle 900 over the entire cross section at the light input side 908. The entire cross section includes the outer fiber region 904 and the inner fiber region 905. The first illumination light 911 may include the wavelength range of a white light source and/or of a laser light source. A second illumination light 912 with the same first numerical aperture is available at the light output side 909 over the entire cross section.

In a second case 920, a third illumination light 921 with the first numerical aperture is coupled into the optical fiber bundle 900 only over the cross section of the inner fiber region 905. By way of example, the third illumination light 921 includes the wavelength range of a laser light source. A fourth illumination light 922 with the same first numerical aperture is only emitted over the cross section of the inner fiber region 905 at the light output side 909.

In a third case 930, a fifth illumination light 931 with a second numerical aperture is coupled into the optical fiber bundle 900 only over the cross section of the inner fiber region 905, like in the second case 920. By way of example, the fifth illumination light 931 includes the wavelength range of a laser light source. A sixth illumination light 932 with the same second numerical aperture is only emitted over the cross section of the inner fiber region 905 at the light output side 909.

FIG. 9B elucidates that it is also possible to couple light into the fiber region with the smaller diameter and that the value of the numerical aperture is maintained even in the case of guidance through the optical fiber bundle 900. Hence, the light source device can be used together with the optical fiber bundle 900 in particularly efficient fashion for an illumination of an object region that has a spot illumination beam path. Mixing the optical fiber bundles advantageously reduces inhomogeneities in the illuminated field in the object plane.

The optical fiber bundle 900 is likewise suitable for use in combination with a Köhler illumination. Moreover, it can also be used together with other light sources, in particular white light sources.

By way of example, if the illuminated field of a white light source is formed by a honeycomb condenser that is imaged by way of an imaging optical device in the light source output plane onto the light input side 908 of the optical fiber bundle 900, the honeycomb structure is advantageously no longer visible in the light distribution at the light output side 909 of the well mixed optical fiber bundle 900. Consequently, the honeycomb pattern does not propagate into the illuminated field of the object plane of the surgical microscope. Even if the first illuminated field of a laser light source, for example, is formed by a honeycomb condenser and if this light source is used together with a spot illumination beam path, a good homogeneity of the illuminated field in the object plane can be brought about by the optical fiber bundle 900.

Figure 9C:
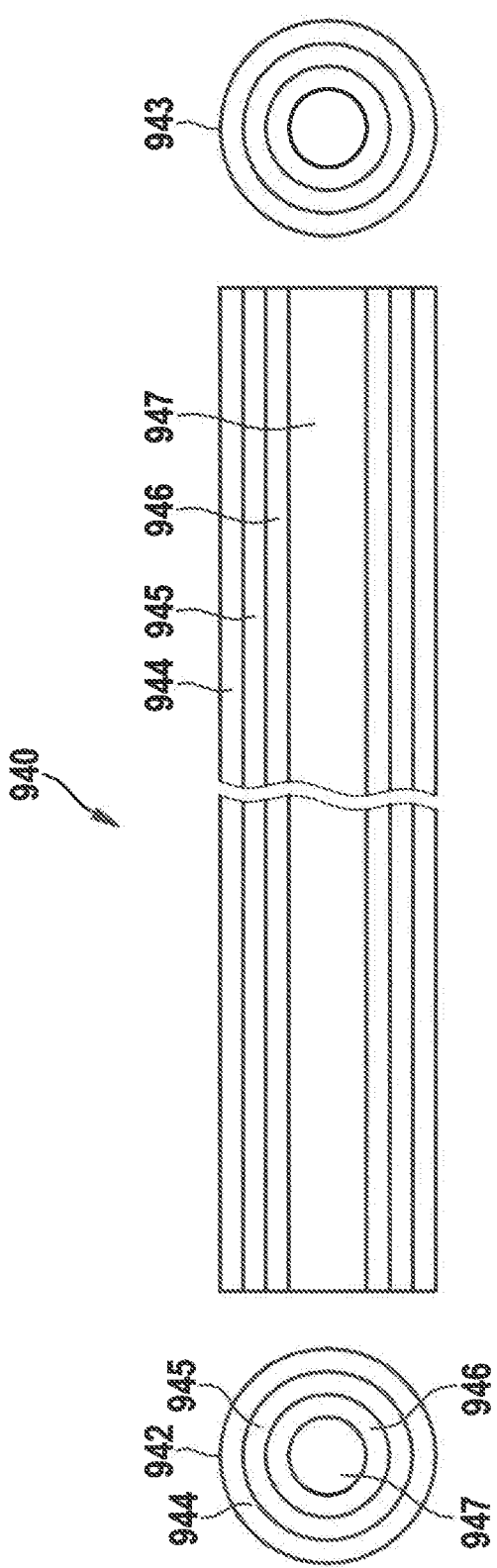
FIG. 9C shows a second exemplary embodiment for an optical fiber bundle, embodied as a multi-region fiber bundle.

FIG. 9C shows a second exemplary embodiment for an optical fiber bundle, embodied as a multi-region fiber bundle.

FIG. 9C shows, in a sectional illustration, a side view of an optical fiber bundle 900 and, respectively in a plan view, a first fiber end 942 and a second fiber end 943. The optical fiber bundle forms a multi-region fiber bundle and includes four separate regions. A first fiber region 944 forms an outer fiber region. Following this, a second fiber region 945, a third fiber region 946 and a fourth fiber region 947 are arranged. The fourth fiber region 947 forms an inner fiber region. Each fiber region includes many individual fibers which, although they are separated in regions, are arranged in unsorted fashion within a region. Three or more than four fiber regions may also be arranged in the optical fiber bundle 940 in one embodiment. Consequently, the multi-region fiber bundle includes a total of n disjoint fiber regions. The fiber regions 944, 945, 946, 947 are arranged concentrically in FIG. 9C.

If an optical fiber bundle is embodied as a two-region fiber bundle or as a multi-region fiber bundle and if the fibers in each fiber region are well mixed, a very homogeneous illumination is achieved in the object plane. The homogeneous good illumination quality is achievable both for a white light source and for a laser light source, or else a combination of the two light sources.

It is understood that the foregoing description is that of the exemplary embodiments of the disclosure and that various changes and modifications may be made thereto without departing from the spirit and scope of the disclosure as defined in the appended claims.

LIST OF REFERENCE SIGNS 100, 200 Illumination apparatus
101, 201, 301, 401, 501 Laser light source
102, 202, 402, 502, 802 First optical axis
103, 303, 403, 503 Laser light
104, 204, 404, 504 Focusing optical device
105, 305, 405, 505 Laser light
106, 206, 306, 406, 506, 806 First scattering element SE1
107, 207, 407, 507, 807 First plane
108, 308, 808 First beam cross section
109, 409, 509, 809 First scattered beam
110, 210, 310, 410, 510 Collector optical device OS1

111, 411, 511 Collimated beam path
112, 212, 312, 412, 512 Second scattering element SE2
113, 213, 413, 513 Second plane
114, 214, 314, 414, 514, 614, 714 First illuminated field LF1
115, 415, 515 Illumination light, from a second scattering element SE2
120, 220, 620, 720 Optical input coupling element OEE
121, 221 Second light source
122, 222 Second optical axis
123, 623, 723 Second illuminated field LF2
130, 230, 330, 430, 530, 630, 730 Imaging optical device
131, 231, 331, 431, 531, 631, 731 Light source output plane
132, 632, 732 Light guide
140 Surgical microscope
141 Main objective lens
142 Third optical axis
143 Illumination optical device
150 Object plane
224 First red individual light source
225 Second green individual light source
226 Third blue individual light source
227 Trichroic beam splitter
228 Honeycomb condenser
233 First lens
234 Second lens
235 Third lens
251 First collector lens
252 Second collector lens
253 Third collector lens
254 First additional lens
255 Second additional lens
360, 460, 560 Afocal zoom system
461, 561 First lens group
462, 562 Second lens group
463, 563 Third lens group
464, 564 Fourth lens group
370, 470, 670 Imaging optical device that is telecentric on both sides
371, 471, 671 First lens element
372, 472, 672 Second lens element
380, 580, 780 Collimating imaging optical device
381, 581, 781 Second collector optical device
390 First light source device
391, 691, 791 First assembly
392 Second assembly
393 Third assembly
394 Fourth assembly
395 Second light source device
696, 796 Fifth assembly
699, 799 Double-headed arrow
801A, 801D First laser light source module
801B, 801E Second laser light source module
801C, 801F Third laser light source module
804 Focusing element
816 First arrangement
817 First arrangement
818 Third arrangement
819 Fourth arrangement
900 Optical fiber bundle
901 Sectional illustration
902, 942 First fiber end
903, 943 Second fiber end
904 Outer fiber region
905 Inner fiber region
906 Outer diameter
907 Inner diameter
908 Light input side
909 Light output side
910 First case
911 First illumination light
912 Second illumination light
920 Second case
921 Third illumination light
922 Fourth illumination light
930 Third case
931 Fifth illumination light
932 Sixth illumination light
940 Optical fiber bundle
944 First fiber region
945 Second fiber region
946 Third fiber region
947 Fourth fiber region

What is claimed is:

1. A light source for a surgical microscope, the light source comprising:
a laser light source;
a white light source;
an imaging optical device;
a first scattering element defining a first plane on the first scattering element;
a second scattering element defining a second plane on the second scattering element;
a collector optical device arranged between the first scattering element and the second scattering element and having a first focal length and a first focus,
wherein the first focus of the collector optical device lies in the first plane on the first scattering element,
wherein laser light emitted by the laser light source is focused by a focusing optical device on a first beam cross section with a first dimension in the first plane on the first scattering element,
wherein a scattered beam emanating from the first scattering element is imaged at infinity with a first numerical aperture by the collector optical device and produces a second beam cross section with a second dimension in the second plane on the second scattering element,
wherein the second scattering element emits a beam of illumination light with a second numerical aperture at each point of the second beam cross section in the second plane,
wherein illumination light emanating from the second scattering element forms a first illuminated field,
wherein the first illuminated field is imageable into an object plane,
wherein illumination light emanating from the white light source forms a second illuminated field of a second illumination beam path,
wherein the imaging optical device is arranged in a beam path downstream of the second scattering element and the white light source, and
wherein the imaging optical device is telecentric on both sides.

2. The light source according to claim 1,
wherein a scattering effect of the first scattering element is constant over an area of the first scattering element.

3. The light source according to claim 1,
wherein a scattering effect of the first scattering element varies over an area of the first scattering element.

4. The light source according to claim 1,
wherein the first dimension of the first beam cross section has a value in a range of between 0.1 millimeters and 5 millimeters in the first plane.

5. The light source according to claim 1, further including an interchanger,
  wherein the first scattering element is arranged on the interchanger, and
  wherein the interchanger includes at least two first scattering elements each having a different scattering effect.

6. The light source according to claim 1,
  wherein the collector optical device is formed by a single lens.

7. The light source according to claim 1,
  wherein the collector optical device includes at least two lenses which are movable to permit the first focal length of the collector optical device to be variably adjustable.

8. The light source according to claim 1,
  wherein a scattering effect of the second scattering element is constant over an area of the second scattering element.

9. The light source according to claim 1, further including an interchanger,
  wherein the second scattering element is arranged on the interchanger, and
  wherein the interchanger includes at least two second scattering elements each having a different scattering effect.

10. The light source according to claim 1,
  wherein the imaging optical device is embodied as a finite imaging optical device that images the first illuminated field into a light source output plane with an imaging scale.

11. The light source according to claim 1,
  wherein the imaging optical device is a collimating imaging optical device.

12. The light source according to claim 11,
  wherein the collector optical device is a first collector optical device, and
  wherein the collimating imaging optical device includes a second collector optical device with a second focal length.

13. The light source according to claim 1,
  wherein an optical input coupling element is arranged downstream of the second scattering element.

14. The light source according to claim 1, further comprising an optical input coupling unit,
  wherein the imaging optical device includes at least two optical elements, and
  wherein an optical input coupling element is arranged between the at least two optical elements.

15. The light source according to claim 1,
  wherein the first illuminated field and the second illuminated field of the second illumination beam path are couplable by an optical input coupling element and illumination light is guided along a common beam path downstream of the optical input coupling element to a light source output plane.

16. The light source according to claim 1,
  wherein the laser light source includes at least two laser light source modules, and
  wherein laser light of the at least two laser light source modules is guided in a unified fashion to the first scattering element.

17. The light source according to claim 1, further comprising:
  a light guide; and
  an optical fiber bundle,
  wherein the light guide or the optical fiber bundle is arranged in a light source output plane.

18. The light source according to claim 1, further comprising a structured light guide,
  wherein the structured light guide is arranged in a light source output plane.

19. The light source according to claim 1, further comprising an optical fiber bundle,
  wherein the optical fiber bundle is arranged in a light source output plane, and
  wherein the optical fiber bundle has at least two delimited regions with incoherent optical fibers.

20. The surgical microscope comprising an illumination beam path and a light source according to claim 1.

* * * * *